United States Patent [19]

Jouppi et al.

[11] Patent Number: 5,261,066
[45] Date of Patent: Nov. 9, 1993

[54] DATA PROCESSING SYSTEM AND METHOD WITH SMALL FULLY-ASSOCIATIVE CACHE AND PREFETCH BUFFERS

[75] Inventors: Norman P. Jouppi; Alan Eustace, both of Palo Alto, Calif.

[73] Assignee: Digital Equipment Corporation, Maynard, Mass.

[21] Appl. No.: 499,958

[22] Filed: Mar. 27, 1990

[51] Int. Cl.⁵ .................. G06F 12/00; G06F 13/00; G06F 12/08
[52] U.S. Cl. ................ 395/425; 364/DIG. 1; 364/243.45
[58] Field of Search .......... 364/DIG. 1, DIG. 2, 364/243, 243.45, 243.7, 964, 343, 964.22, 964.23, 964.6, 964.5

[56] References Cited

U.S. PATENT DOCUMENTS

| | | | |
|---|---|---|---|
| 4,464,712 | 8/1984 | Fletcher | 395/425 |
| 4,783,736 | 11/1988 | Ziegler et al. | 364/200 |
| 4,794,521 | 12/1988 | Ziegler et al. | 364/200 |
| 4,797,814 | 1/1989 | Brenza | 364/200 |
| 4,811,209 | 3/1989 | Rubenstein | 364/200 |
| 4,853,846 | 8/1989 | Johnson et al. | 364/200 |
| 4,888,679 | 12/1989 | Fossum et al. | 395/800 |
| 4,928,225 | 5/1990 | McCarthy et al. | 395/425 |
| 4,953,073 | 8/1990 | Moussouris et al. | 364/200 |
| 4,969,122 | 11/1990 | Jensen | 365/49 |
| 5,027,270 | 6/1991 | Riordan et al. | 364/200 |
| 5,155,832 | 10/1992 | Hunt | 395/425 |

OTHER PUBLICATIONS

Smith, "Cache Memories," 14 *Computing Surveys* 473-530 (Sep. 1982).

*Primary Examiner*—Alyssa H. Bowler
*Attorney, Agent, or Firm*—Flehr, Hohbach, Test, Albritton & Herbert

[57] ABSTRACT

A memory system (10) utilizes miss caching by incorporating a small fully-associative miss cache (42) between a cache (18 or 20) and second-level cache (26). misses in the cache (18 or 20) that hit in the miss cache have only a one cycle miss penalty, as opposed to a many cycle miss penalty without the miss cache (42). Victim caching is an improvement to miss caching that loads a small, fully associative cache (52) with the victim of a miss and not the requested line. Small victim caches (52) of 1 to 4 entries are even more effective at removing conflict misses than miss caching. Stream buffers (62) prefetch cache lines starting at a cache miss address. The prefetched data is placed in the buffer (62) and not in the cache (18 or 20). Stream buffers (62) are useful in removing capacity and compulsory cache misses, as well as some instruction cache misses. Stream buffers (62) are more effective than previously investigated prefetch techniques when the next slower level in the memory hierarchy is pipelined. An extension to the basic stream buffer, called multi-way stream buffers (62), is useful for prefetching along multiple intertwined data reference streams.

16 Claims, 21 Drawing Sheets

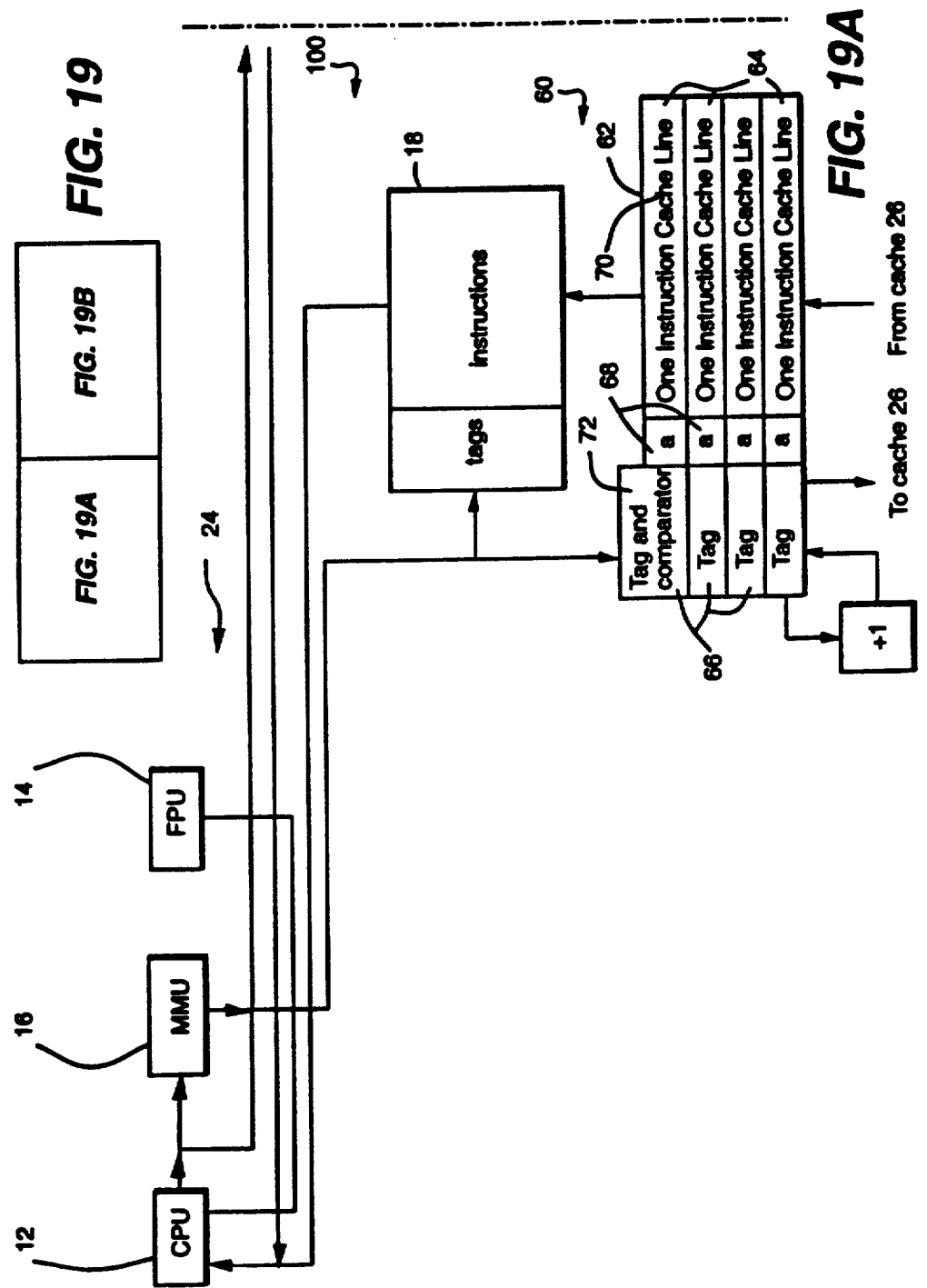

DATA PROCESSING SYSTEM AND METHOD WITH SMALL FULLY-ASSOCIATIVE CACHE AND PREFETCH BUFFERS

BACKGROUND OF THE INVENTION

1. Field of the Invention

The present invention relates generally to a system and method for improving performance of a memory hierarchy in data processing. More particularly, it relates to such a system and method which improves system performance of a cache memory. Most especially, the invention relates to such a system and method which substantially reduces miss penalties for cache memory accesses.

2. Description of the Prior Art

Cache performance is becoming increasingly important since it has a dramatic effect on the performance of advanced processors. Table 1 lists some cache miss times and the effect of a miss on machine performance. Over the last decade, cycle time has been decreasing much faster than main memory access time. The average number of machine cycles per instruction has also been decreasing dramatically, especially when the transition from complex instruction set computer (CISC) machines to reduced instruction set computer (RISC) machines is included. These two effects are multiplicative and result in tremendous increases in miss cost. For example, a cache miss on a Digital Equipment Corporation VAX 11/780 only costs 60% of the average instruction execution. Thus, even if every instruction had a cache miss, the machine performance would slow down by only 60%. However, if a RISC machine like the Digital Equipment Corporation WRL Titan has a miss, the cost is almost ten instruction times. Moreover, these trends seem to be continuing, especially the increasing ratio of memory access time to machine cycle time. In the future, a cache miss all the way to main memory on a superscalar machine executing two instructions per cycle could cost well over 100 instruction times. Even with careful application of well-known cache design techniques, machines with main memory latencies of over 100 instruction times can easily lose over half of their potential performance to the memory hierarchy. This makes both hardware and software research on advanced memory hierarchies increasingly important.

TABLE 1

| Machine | cycles per instr | cycle time (ns) | mem time (ns) | miss cost (cycles) | miss cost (instr) |
|---|---|---|---|---|---|
| VAX 11780 | 10.0 | 200 | 1200 | 6 | .6 |
| WRL Titan | 1.4 | 45 | 540 | 12 | 8.6 |
| ? | 0.5 | 4 | 280 | 70 | 140.0 |

SUMMARY OF THE INVENTION

A memory system in accordance with this invention has a first cache memory and a second memory. A miss cache is connected between the first cache memory and the second memory. The miss cache has a smaller memory capacity than the first memory. A means is connected to the first cache memory, the second memory and the miss cache for addressing information and for supplying information to the first cache memory and to the miss cache when a miss occurs in the first cache memory for addressed information.

A memory accessing method in accordance with this invention includes addressing a first cache memory and determining if a miss occurs in the first cache memory in response to the addressing. Information is supplied from a second memory to the first cache memory and to the miss cache when a miss occurs in the first cache memory.

The attainment of the foregoing and related advantages and features of the invention should be more readily apparent to those skilled in the art, after review of the following more detailed description of the invention, taken together with the drawings, in which:

BRIEF DESCRIPTION OF THE DRAWINGS

FIG. 19 is a key showing placement of FIGS. 19A and 19B.

FIGS. 19A and 19B are a block diagram of a system portion corresponding generally to a combination of the system portions of FIGS. 7, 13 and 16, showing another embodiment of the invention.

DETAILED DESCRIPTION OF THE INVENTION

Figure 1:
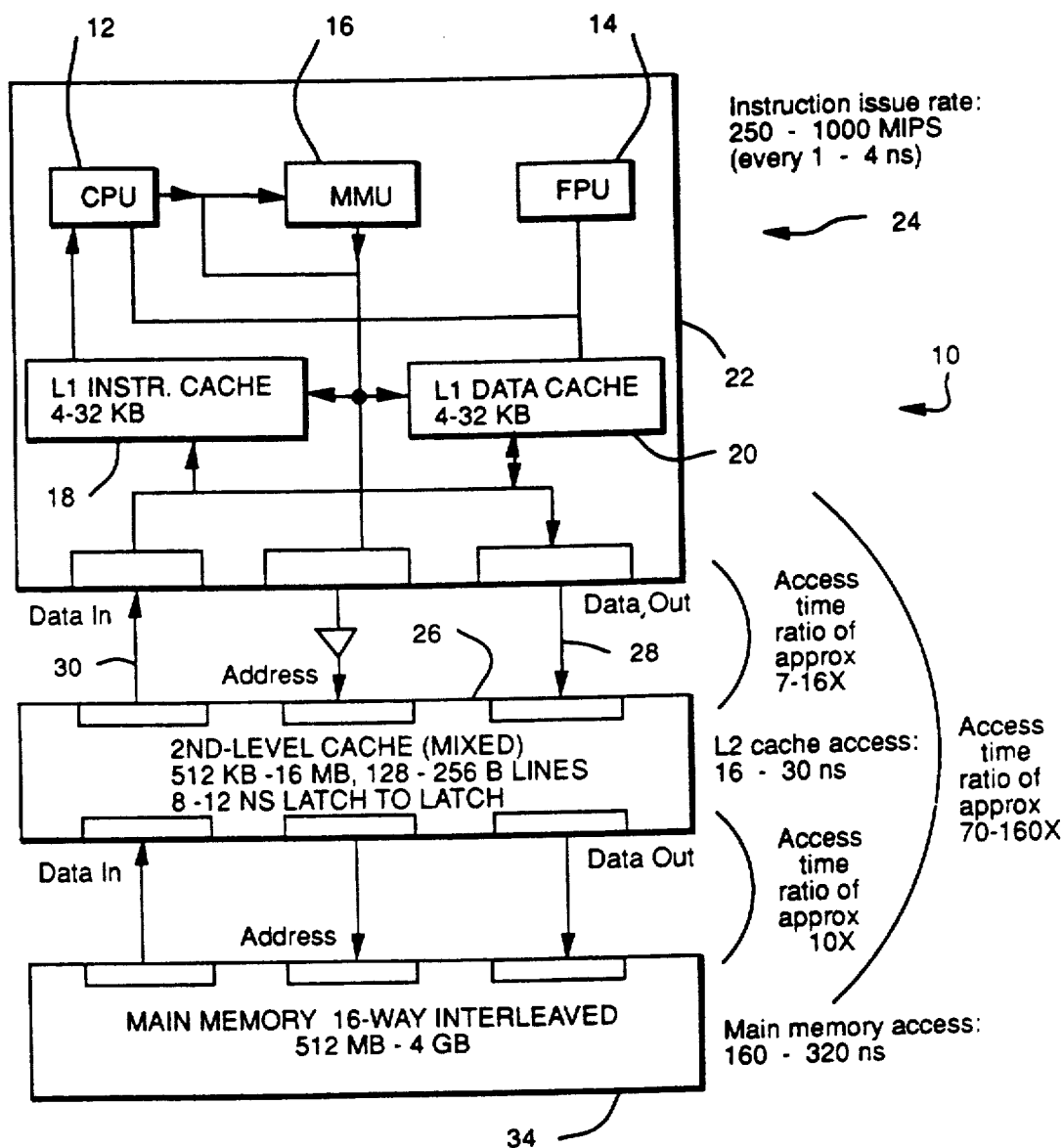
FIG. 1 is a block diagram of a baseline system in which the present invention may be incorporated.

FIG. 1 shows the range of configurations of interest in this study. A CPU 12, floating-point unit 14, memory management unit 16 (e.g., translation look-aside buffer or TLB), and first level instruction and data caches 18 and 20 are on the same chip 22 or on a single high-speed module built with an advanced packaging technology. (We will refer to the central processor 24 as a single chip in the remainder of the specification, but chip or module is implied.) The cycle time off this chip 22 is 3 to 8 times longer than the instruction issue rate (i.e., 3 to 8 instructions can issue in one off-chip clock cycle). This is obtained either by having a very fast on-chip clock (e.g. superpipelining), by issuing many instructions per cycle (e.g., superscalar or very long instruction word, VLIW), and/or by using higher speed technologies for the processor chip 22 than for the rest of the system (e.g., GaAs vs. BiCMOS).

The expected size of the on-chip caches 18 and 20 varies with the implementation technology for the processor 24, but higher-speed technologies generally result in smaller on-chip caches. For example, quite large on-chip caches 18 and 20 should be feasible in CMOS but only small caches 18 or 20 are feasible in the near term for GaAs or bipolar processors. Thus, although GaAs and bipolar are faster, the higher miss rate from their smaller caches tends to decrease the actual system performance ratio between GaAs or bipolar machines and dense CMOS machines to less than the ratio between their gate speeds. In all cases the first-level caches 18 and 20 are assumed to be direct-mapped, since this results in the fastest effective access time. Line sizes in the on-chip caches 18 and 20 are most likely in the range of 16B to 32B. The data cache 20 may be either write-through or write-back, but this description does not examine those tradeoffs.

Second level cache 26 is assumed to range from 512 KB to 16 MB, and to be built from very high speed static RAMs. It is assumed to be direct-mapped for the same reasons as the first level caches 18 and 20. For caches 26 of this size access times of 16 to 30 ns are likely. This yields an access time for the cache of 4 to 30 instruction times. The relative speed of the processor 24 as compared to the access time of the cache 26 implies that the second level cache must be pipelined in order for it to provide sufficient bandwidth. For example, consider the case where the first level cache 18 and 20 is a write-through cache. Since stores typically occur at an average rate of 1 in every 6 or 7 instructions, an unpipelined external cache 26 would not have even enough bandwidth to handle the store traffic for access times greater than seven instruction times. Caches have been pipelined in mainframes for a number of years, but this is a recent development for workstations. Recently cache chips with ECL I/O's and registers or latches 28 on their inputs and outputs have appeared; these are ideal for pipelined caches. The number of pipeline stages in a second level cache access could be 2 to 3 depending on whether the pipestage 28 going from the processor chip 22 to the cache chips and the pipestage 30 returning from the cache chips to the processor 24 are full or half pipestages.

In order to provide sufficient memory for a processor 24 of this speed (e.g., several megabytes per MIP), main memory 34 should be in the range of 512 MB to 4 GB. This means even using 16 Mb DRAMs that it will contain roughly a thousand DRAMs. The main memory system 34 probably will take about ten times longer for an access than the second level cache 26. This access time for main memory 34 can be dominated by the time required to fan out address and data signals among a thousand DRAMs spread over many cards. Thus, even with the advent of faster DRAMs, the access time for main memory may stay roughly the same. The relatively large access time for main memory in turn requires that second level cache line sizes of 128 or 256B are needed. For example, consider the case where only 16B are returned after 320 ns. This is a bus bandwidth of 50 MB/sec. Since a 10 MIP processor with this bus bandwidth would be bus-bandwidth limited in copying from one memory location another, little extra performance would be obtained by the use of a 100 to 1,000 MIP processor. This is an important consideration in the system performance of a processor.

Several observations are in order on baseline system 10. First, the memory hierarchy of the system is actually quite similar to that of a machine like a VAX 11/780, only each level in the hierarchy has moved up one level towards the CPU 12. For example, the 8 KB board level cache in the 780 has moved on-chip. The 512 KB to 16 MB main memory on early VAX models has become the board-level cache 26. Just as in the 780's main memory, the incoming transfer size is large (128-256B here vs. 512B pages in the VAX). The main memory 34 in this system is of similar size to the disk subsystems of the early 780's and performs similar functions such as paging and file system caching.

Figure 2:
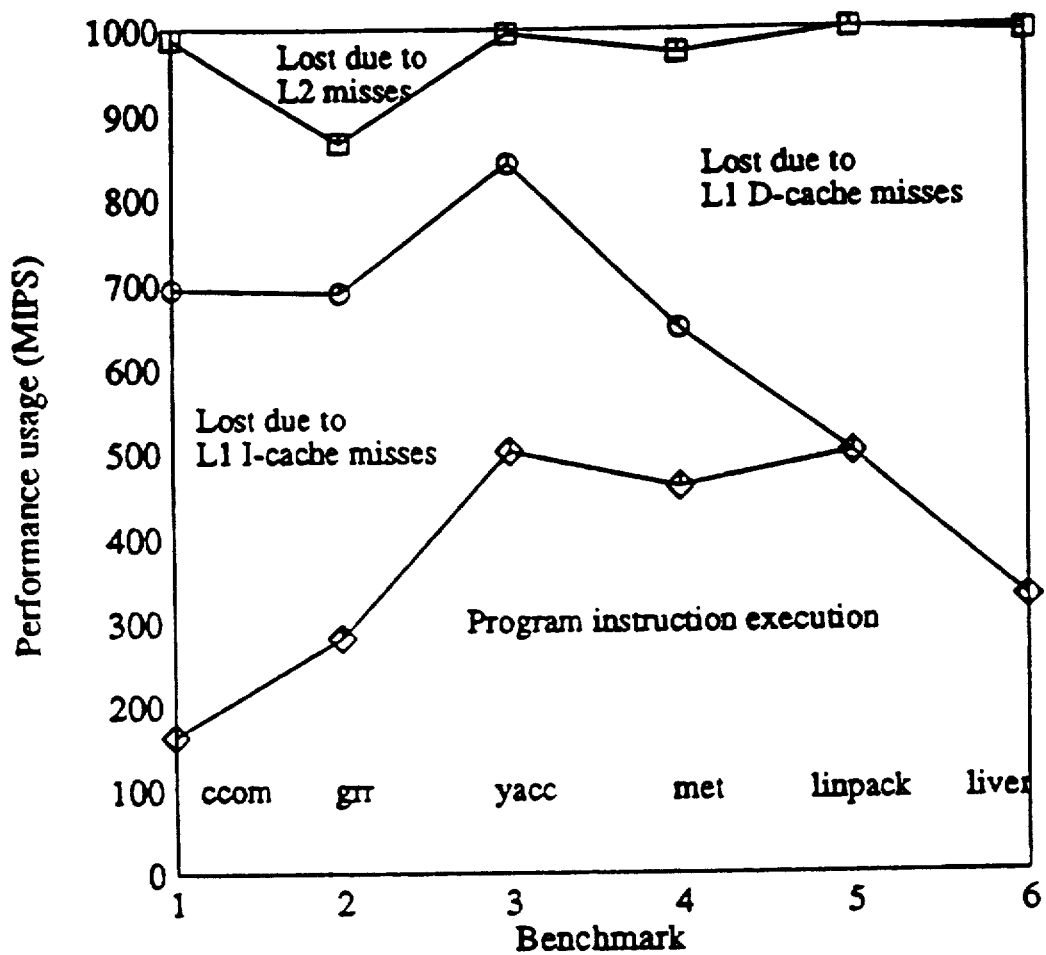
FIG. 2 is a graph showing performance of the system of FIG. 1 without incorporation of the invention.

The memory hierarchy performance of a system 10 with parameters in this range is given in FIG. 2. The actual parameters assumed for the system are 1,000 MIPS instruction issue rate, 4 KB first-level instruction and 4 KB data caches with 16B lines, and 1 MB second-level cache with 128B lines. The miss penalties are assumed to be 24 instruction times for the first level and 320 instruction times for the second level. The characteristics of the test programs are given in Table 2. These benchmarks are reasonably long in comparison with most traces in use today, however the effects of multiprocessing have not been modeled in this work.

As can be seen in FIG. 2, most benchmarks lose over half of their potential performance in first level cache misses. Only relatively small amounts of performance are lost to second-level cache misses. This is primarily due to the large second-level cache size in comparison to the size of the programs executed. Longer traces of larger programs exhibit significant numbers of second-level cache misses. Since the test suite used in this description is too small for significant second-level cache activity, second-level cache misses will not be investigated in detail.

TABLE 2

| program name | dynamic instr. | data refs | total refs. | program type |
|---|---|---|---|---|
| ccom | 31.5M | 14.0M | 45.5M | C compiler |
| grr | 134.2M | 59.2M | 193.4M | PC board CAD tool |
| yacc | 51.0M | 16.7M | 67.7M | Unix utility |
| met | 99.4M | 50.3M | 149.7M | PC board CAD tool |
| linpack | 144.8M | 40.7M | 185.5M | numeric, 100 × 100 |
| liver | 23.6M | 7.4M | 31.0M | LFK (numeric loops) |

Since the assumed parameters are at the extreme end of the ranges (maximum performance processor with minimum size caches), the other configurations would lose proportionally less performance in their memory hierarchy. Nevertheless, any configuration in the range of interest will lose a substantial proportion of its potential performance in the memory hierarchy. This means that the greatest leverage on system performance will be obtained by improving the memory hierarchy performance, and not by attempting to further increase the performance of the CPU (e.g. by more aggressive parallel issuing of instructions). Techniques for improving the performance of the baseline memory hierarchy at low cost are the subject of the remainder of this description. Finally, in order to avoid compromising the performance of the CPU core (comprising of the CPU 12, FPU 14, MMU 16, and first level caches 18 and 20), any additional hardware required by the techniques to be investigated should reside outside the CPU core (e.g., below the first level caches 18 and 20). By doing this the additional hardware will only be involved during cache misses, and therefore will not be in the critical path for normal instruction execution.

Misses in caches can be classified into four categories: conflict, compulsory, capacity, and coherence. Conflict misses are misses that would not occur if the cache was fully-associative and had least recently used (LRU) replacement. Compulsory misses are misses required in any cache organization because they are the first references to a piece of data. Capacity misses occur when the cache size is not sufficient to hold data between references. Coherence misses are misses that would not otherwise occur except for invalidation to preserve multiprocessor cache consistency.

Figure 3:
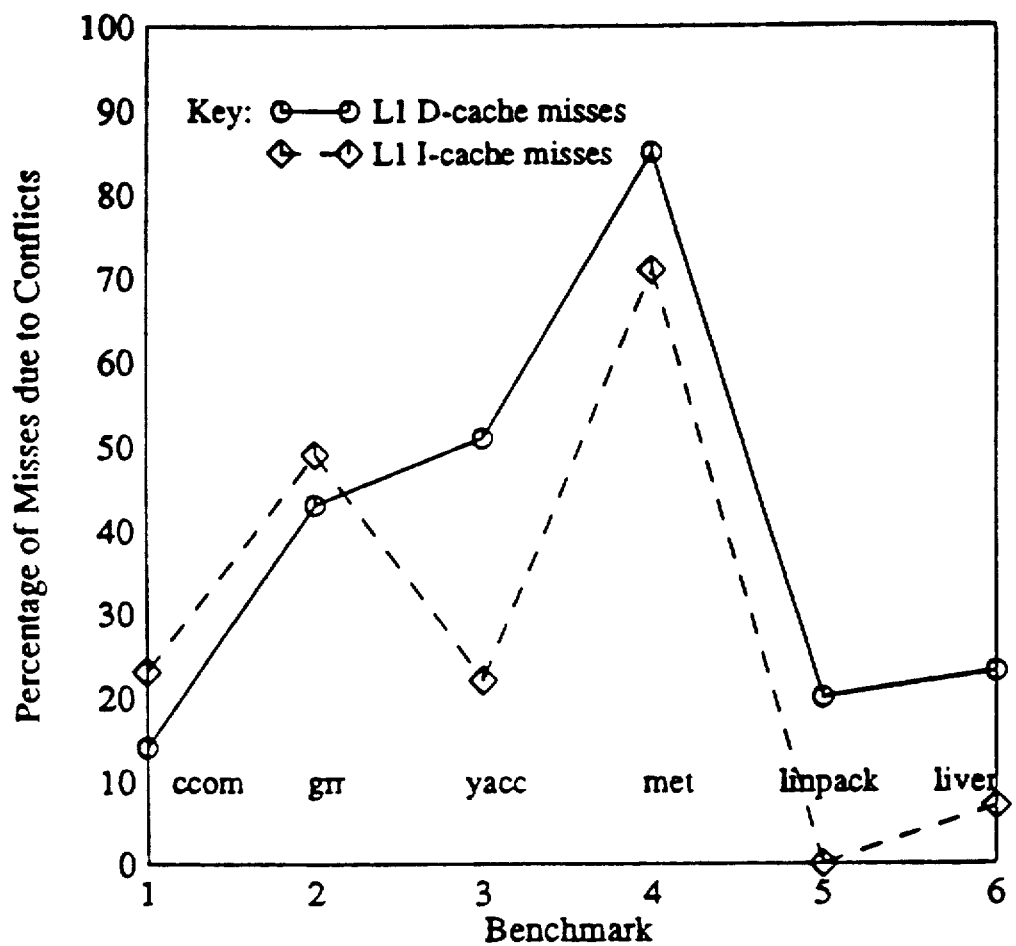
FIG. 3 is a graph showing a further aspect of performance of the system of FIG. 1 without incorporating the invention.

Even though direct-mapped caches have more conflict misses due to their lack of associativity, their performance is still better than set-associative caches when the access time costs for hits are considered. In fact, the direct-mapped cache is the only cache configuration where the critical path is merely the time required to access a RAM. Conflict misses typically account for between 20% and 40% of all direct-mapped cache misses. FIG. 3 details the percentage of misses due to conflicts for our test suite. On average 30% of the first-level data cache misses are due to conflicts, and 20% of the first-level instruction cache misses are due to conflicts. Since these are significant percentages, it would be nice to "have our cake and eat it too" by somehow providing additional associativity without adding to the critical access path for a direct-mapped cache.

Figure 4:
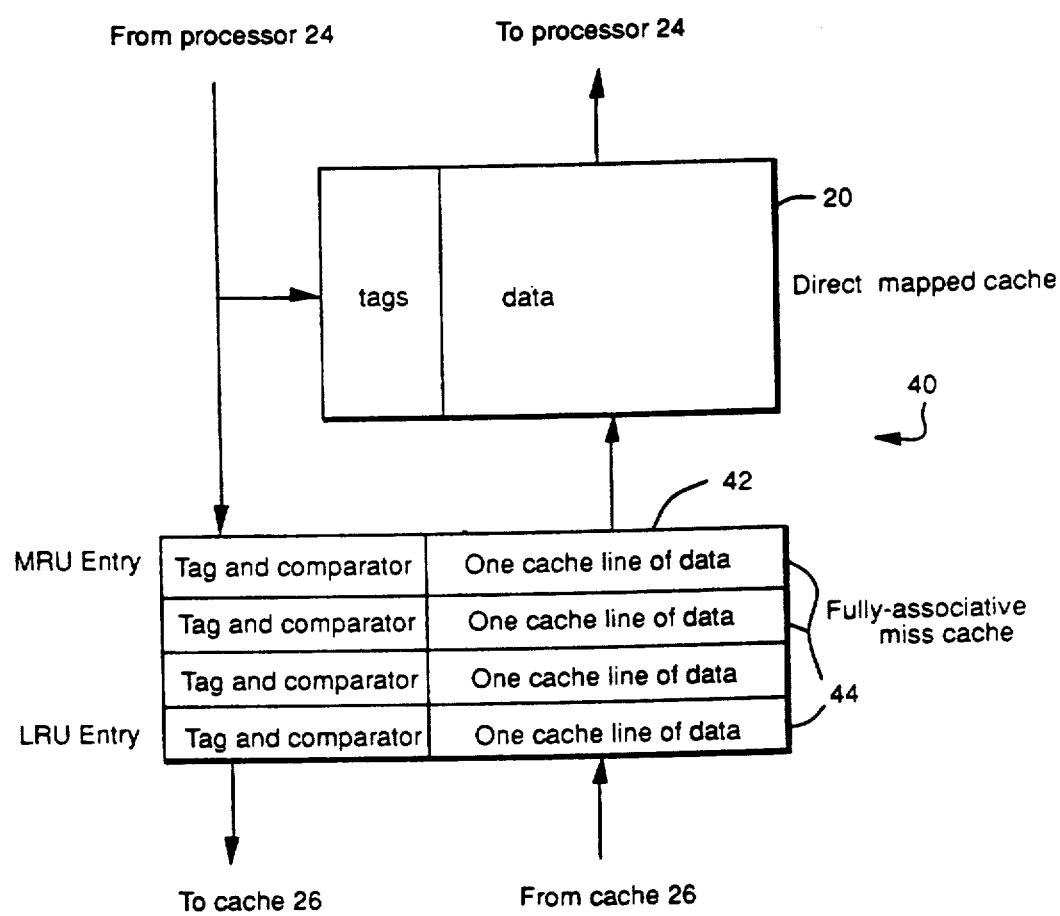
FIG. 4 is a block diagram of a portion of the system shown in FIG. 1, incorporating an embodiment of the invention.

We can add associativity to the direct-mapped cache 20 by placing a small miss cache 42 on-chip between a first-level cache 20 and the access port to the second-level cache, as shown in miss cache system 40 of FIG. 4. The miss cache 42 is a small, fully-associative cache containing on the order of two to eight cache lines 44 of data. When a miss occurs, data is returned not only to the direct-mapped cache 20, but also to the miss cache 42 under it, where it replaces the least recently used item. Each time the upper cache 20 is probed, the miss cache 42 is probed as well. If a miss occurs in the upper cache 20 but the address hits in the miss cache 42, then the direct-mapped cache 20 can be reloaded in the next cycle from the miss cache 42. This replaces a long off-chip miss penalty with a short one-cycle on-chip miss. This arrangement satisfies the requirement that the critical path is not worsened, since the miss cache 42 itself is not in the normal critical path of processor execution.

Figure 5:
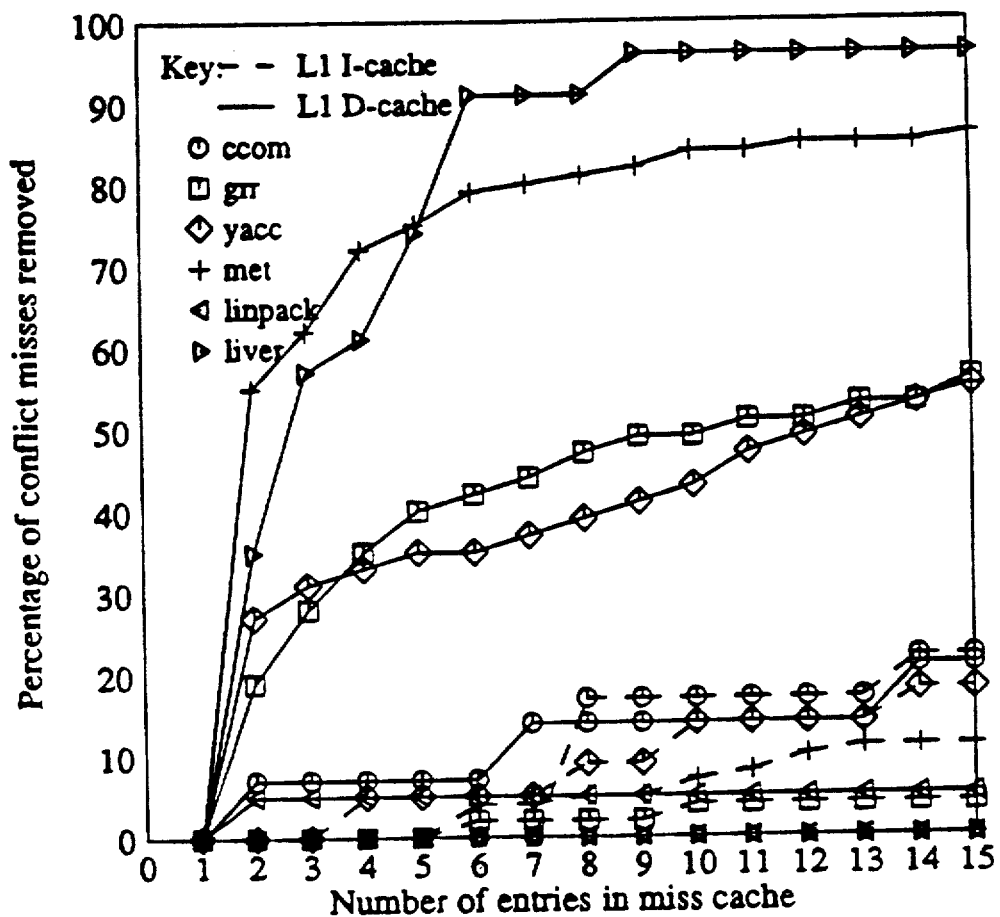
FIGS. 5 and 6 are graphs showing aspects of performance of a system including the portion of FIG. 4.

The success of different miss cache organizations at removing conflict misses is shown in FIG. 5. The first observation to be made is that many more data conflict misses are removed by the miss cache 42 than instruction conflict misses. This can be explained as follows. Instruction conflicts tend to be widely spaced because the instructions within one procedure will not conflict with each other as long as the procedure size is less than the cache size, which is almost always the case. Instruction conflict misses are most likely when another procedure is called. The target procedure may map anywhere with respect to the calling procedure, possibly resulting in a large overlap. Assuming at least 60 different instructions are executed in each procedure, the conflict misses would be separated by more than the 15 lines in the maximum size miss cache 42 tested. In other words, a small miss cache 42 could not contain the entire overlap and so would be reloaded repeatedly before it could be used. This type of reference pattern exhibits the worst miss cache performance.

Figure 6:
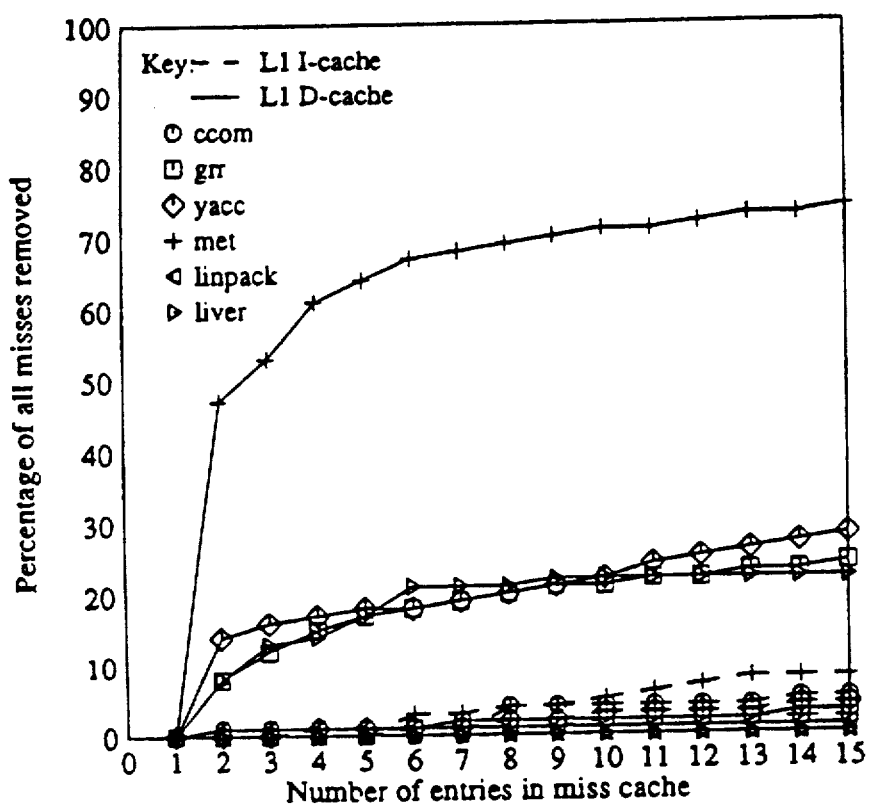

Data conflicts, on the other hand, can be quite closely spaced. Consider the case where two character strings are being compared. If the points of comparison of the two strings happen to map to the same line, alternating references to different strings will always miss in the cache. In this case a miss cache 42 of only two entries would remove all of the conflict misses. Obviously this is another extreme of performance and the results in FIG. 5 show a range of performance based on the program involved. Nevertheless, for 4 KB data caches a miss cache 42 of only 2 entries 44 can remove 25% of the data cache conflict misses on average, or 13% of the data cache misses overall (FIG. 6). If the miss cache 42 is increased to 4 entries 44, 36% of the conflict misses can be removed, or 18% of the data cache misses overall. After four entries 44 the improvement from additional miss cache entries is minor, only increasing to a 25% overall reduction in data cache misses if 15 entries 44 are provided.

Since doubling the data cache 20 size results in a 32% reduction in misses (over this set of benchmarks when increasing data cache size from 4K to 8K), each additional line in the first level cache 20 reduces the number of misses by approximately 0.13%. Although the miss cache 42 requires more area per bit of storage than lines in the data cache 20, each line in a two line miss cache 42 effects a 50 times larger marginal improvement in the miss rate, so this should more than cover any differences in layout size.

Comparing FIG. 5 and FIG. 3, we see that the higher the percentage of misses due to conflicts, the more effective the miss cache 42 is at eliminating them. For example, in FIG. 3 "met" has by far the highest ratio of conflict misses to total data cache 20 misses. Similarly, "grr" and "yacc" also have greater than average percentages of conflict misses, and the miss cache 42 helps these programs significantly as well. "linpack" and "ccom" have the lowest percentage of conflict misses, and the miss cache 42 removes the fewest percentage of these misses of all programs. This implies that if a program has a large percentage of data conflict misses then they must be clustered to some extent because of their overall density. This does not prevent programs with a small number of conflict misses such as "liver" from benefiting from a miss cache, but it seems that as the percentage of conflict misses increases, the percentage of these misses removable by a miss cache increases.

Consider a system with a direct-mapped cache and a miss cache. When a miss occurs, data is loaded into both the miss cache and the direct-mapped cache. In a sense, this duplication of data wastes storage space in the miss cache. The number of duplicate items in the miss cache can range from one (in the case where all items in the miss cache map to the same line in the direct-mapped cache) to all of the entries (in the case where a series of misses occur which do not hit in the miss cache).

Figure 7:
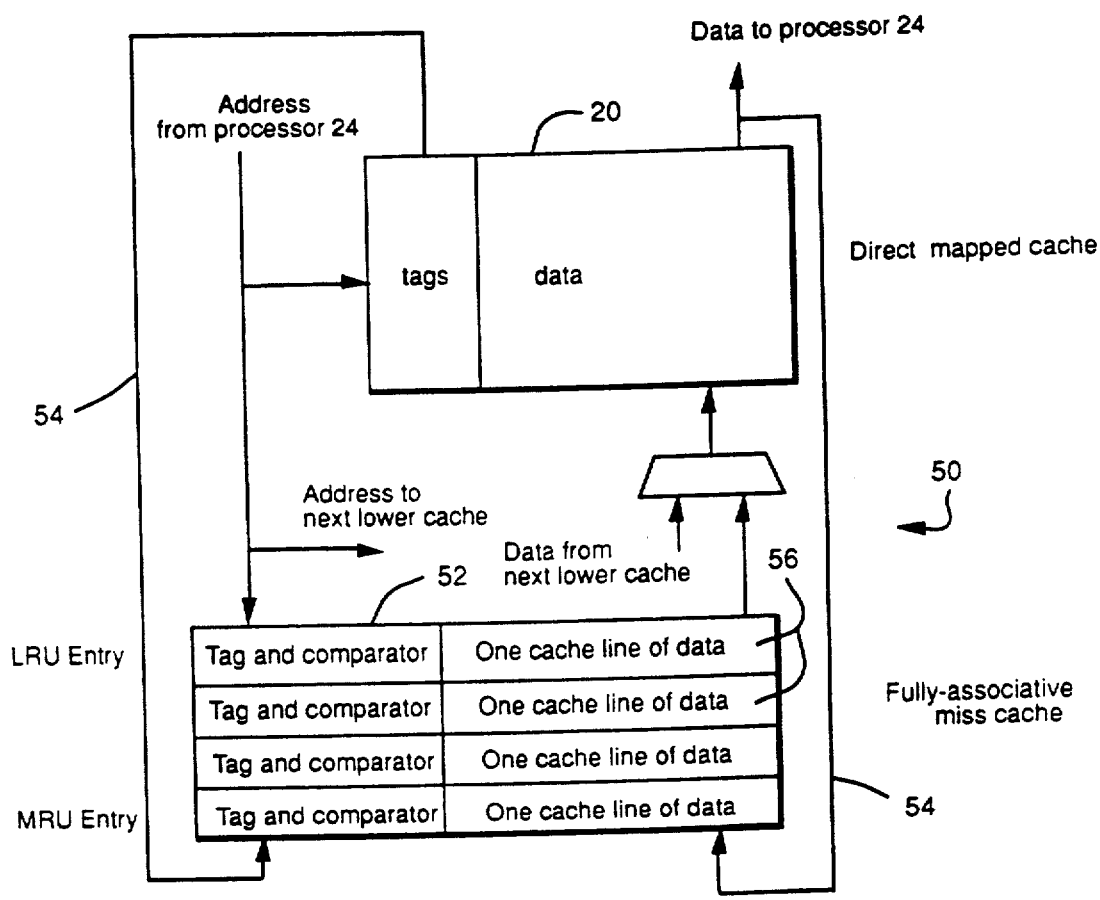
FIG. 7 is a block diagram of a system portion corresponding to that of FIG. 4, but incorporating another embodiment of the invention.

To make better use of the miss cache 42 we can use a different replacement algorithm for a small fully-associative cache 52, as shown in the cache system 50 of FIG. 7. Instead of loading the requested data into the miss cache 42 on a miss, we can load the fully-associative cache 52 with the victim line from the direct-mapped cache 20 as shown at 54 instead. We call this "victim caching". With victim caching, no data line appears both in the direct-mapped cache 20 and the victim cache 52. This follows from the fact that the victim cache 52 is loaded only with items thrown out from the direct-mapped cache 20. In the case of a miss in the direct-mapped cache 20 that hits in the victim cache 52, the contents of the direct-mapped cache line and the matching victim cache line 56 are swapped.

Depending on the reference stream, victim caching can either be a small or significant improvement over miss caching. The magnitude of this benefit depends on the amount of duplication in the miss cache. Victim caching is always an improvement over miss caching.

As an example, consider an instruction reference stream that calls a small procedure in its inner loop that conflicts with its call site. This program execution might have a path length around the conflict loop greater than the number of locations in the miss cache 42. In this case, the miss cache 42 would be of no value since it would be constantly flushed with duplicates of items in the cache. If a victim cache 52 is used instead, however, the path length that can be captured is roughly doubled. This is because one set of conflicting instructions lives in the direct-mapped cache 20, while the other lives in the victim cache 52. As execution proceeds around the loop these items trade places.

Figure 8:
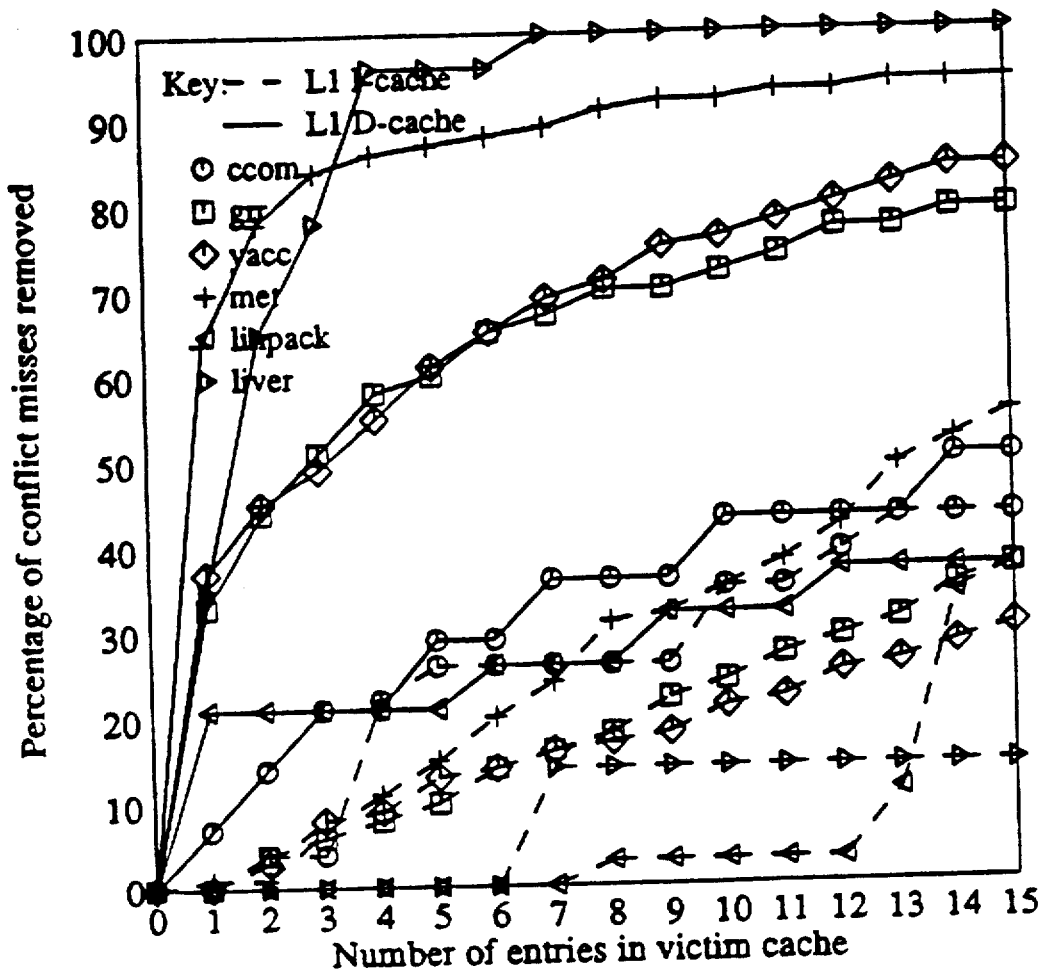
FIGS. 8-11 are graphs showing aspects of performance of a system including the portion of FIG. 7.

The percentage of conflict misses removed by victim caching is given in FIG. 8. Note that victim caches 52 consisting of one line 56 are even useful, in contrast to miss caches 42 which must have two lines 44. All of the benchmarks have improved in comparison to miss caches 42, but the instruction-cache 18 performance and the data cache 20 performance of benchmarks that have long sequential reference streams (e.g., "ccom" and "linpack") improve the most.

Figure 9:
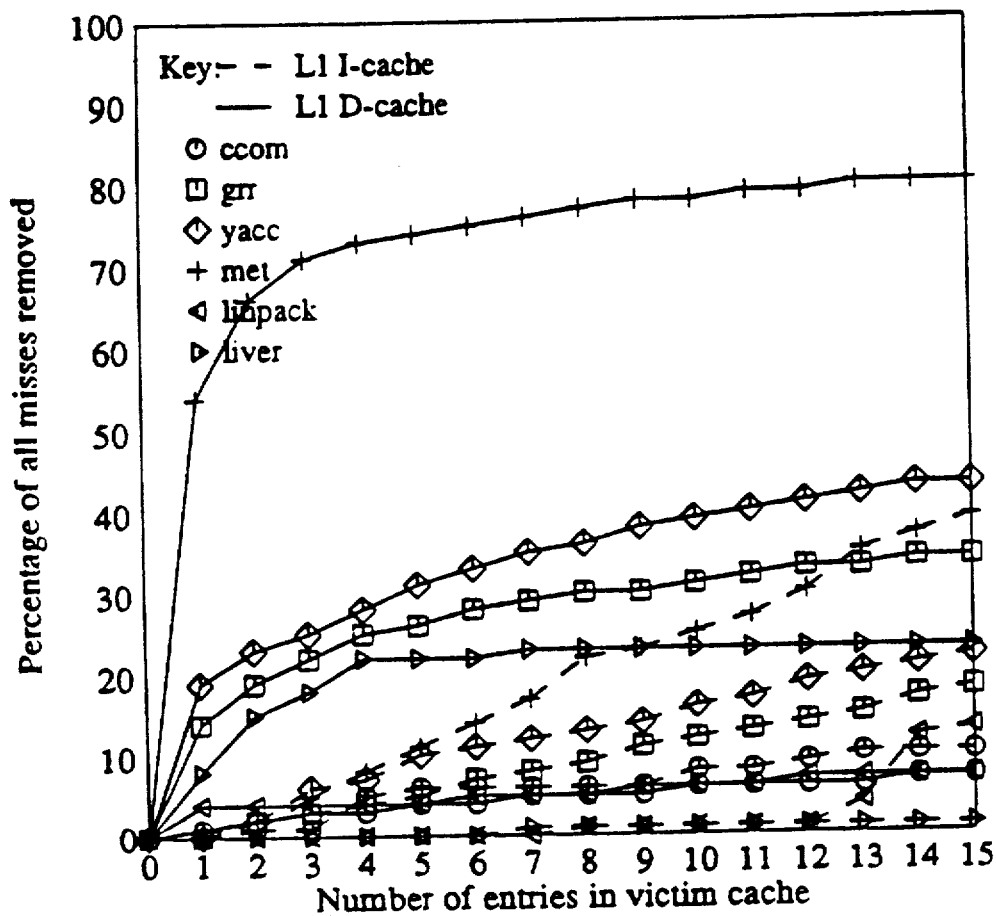

FIG. 9 shows the overall reduction in miss rate possible with victim caching. As can be seen by comparing FIG. 6 and FIG. 9, the performance of the victim cache 52 is in some cases better than a miss cache 42 with twice the number of entries. For example, consider "yacc's" data cache 20 performance with a one-entry victim cache 52 and a two-entry miss cache 42. Because the victim cache 52 does not throw away the victim, in some situations victim caching can result in fewer misses than a miss cache with twice the number of entries. For example, imagine many cache misses occur accessing new data (i.e., compulsory misses), effectively flushing out both a miss cache 42 and a victim cache 52. Next imagine another new line is referenced, causing a miss for both a system 40 with a miss cache 42 and a system 50 with a victim cache 52. If the old contents of the line are referenced next, the miss cache 42 will not contain the items, but a victim cache 52 would. Thus the system 40 with a miss cache 42 would have two misses to the next level in the memory hierarchy, while the system 50 with a victim cache 52 would only have one.

Figure 10:
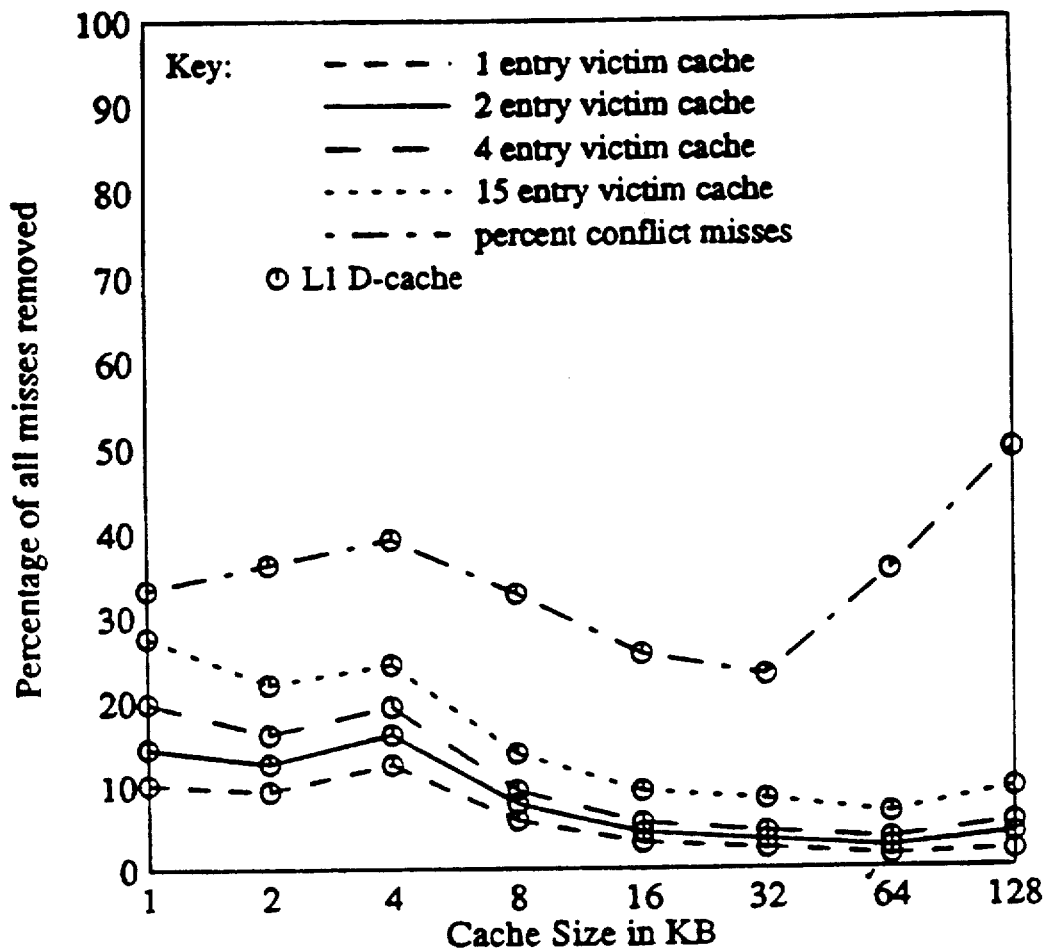

FIG. 10 shows the performance of 1, 2, 4, and 15 entry victim caches when backing up direct-mapped data caches 20 of varying sizes. In general smaller direct-mapped caches 20 benefit the most from the addition of a victim cache 52. Also shown for reference is the total percentage of conflict misses for each cache size. There are two factors to victim cache 52 performance versus direct-mapped cache 20 size. First, as the direct-mapped cache 20 increases in size, the relative size of the victim cache 52 becomes smaller. Since the direct-mapped cache 20 gets larger but keeps the same line size (16B), the likelihood of a tight mapping conflict which would be easily removed by victim caching is reduced. Second, the percentage of conflict misses decreases slightly from 1 KB to 32 KB. As we have seen previously, as the percentage of conflict misses decreases, the percentage of these misses removed by the victim cache 52 decreases. The first effect dominates, however, since as the percentage of conflict misses increases with very large caches, the victim cache 52 performance only improves slightly.

Figure 11:
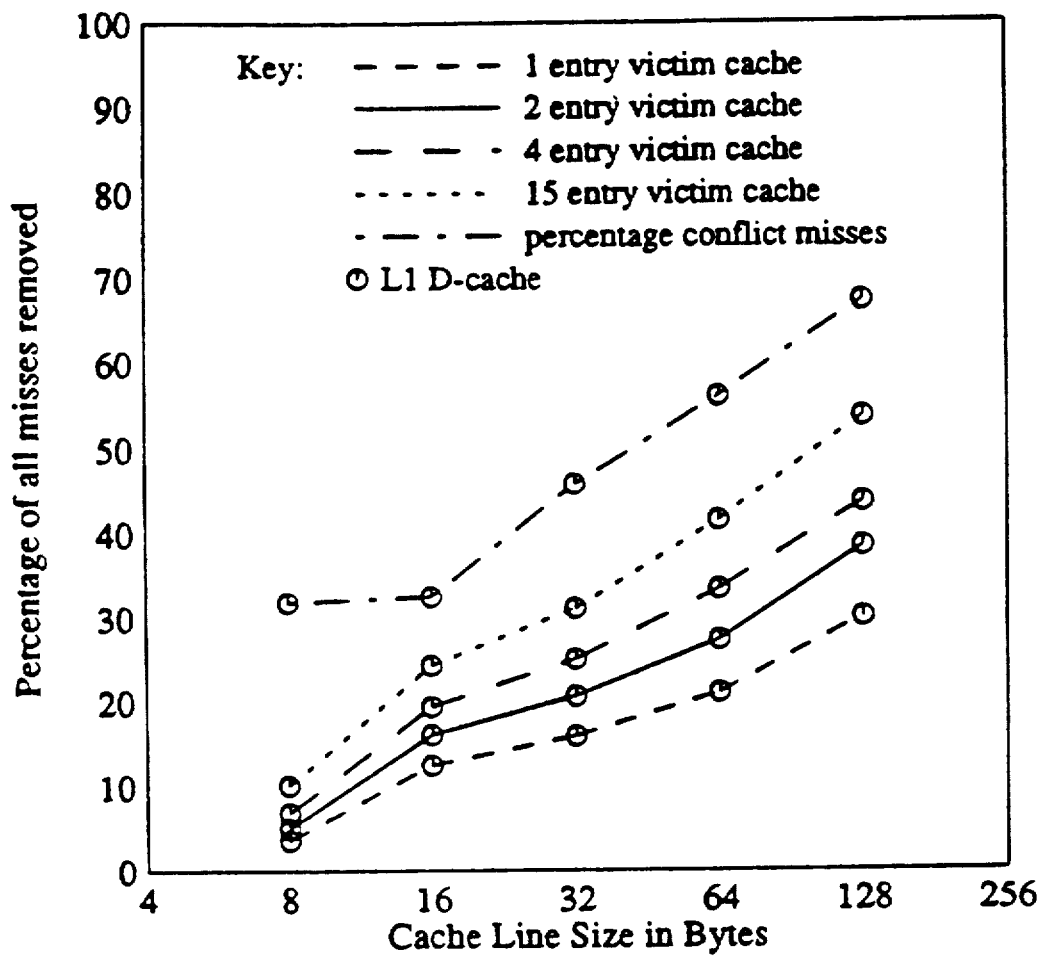

FIG. 11 shows the performance of victim caches 52 for 4 KB direct-mapped data caches 20 of varying line sizes. As one would expect, as the line size at this level increases, the number of conflict misses also increases. The increasing percentage of conflict misses results in an increasing percentage of these misses being removed by the victim cache 52. Systems 50 with victim caches 52 can benefit from longer line sizes more than systems without victim caches, since the victim caches 52 help remove misses caused by conflicts that result from longer cache lines. Note that even if the area used for data storage in the victim cache 52 is held constant (i.e., the number of entries is cut in half when the line size doubles) the performance of the victim cache 52 still improves or at least breaks even when line sizes increase.

As the size of a cache increases, a larger percentage of its misses are due to conflict and compulsory misses and fewer are due to capacity misses. (unless of course the cache is larger than the entire program, in which case only compulsory misses remain.) Thus victim caches 52 might be expected to be useful for second-level caches 26 as well. Since the number of conflict misses increases with increasing line sizes, the large line sizes of second-level caches 26 would also tend to increase the potential usefulness of victim caches 52. As is the case with first-level caches 20, the larger the percentage of conflict misses in a second-level cache 26, the larger the percentage of conflict misses that may be removed by the victim cache 52.

One interesting aspect of victim caches is that they violate inclusion properties in cache hierarchies. This affects not only algorithms used for multiprocessor cache consistency but also those used for cache simulation. For example, the number of misses for a second-level cache 26 on a given CPU reference stream are independent of the size (but not line size) of the first-level cache 20 on top of it. However a victim cache 52 can contain many lines that conflict not only at the first level but also at the second level. Thus, using a first-level victim cache 52 can also reduce the number of conflict misses at the second level. In investigating victim caches 52 for second-level caches 26, both configurations with and without first-level victim caches 52 will need to be considered.

A thorough investigation of victim caches 52 for megabyte second-level caches 26 requires traces of billions of instructions. At this time we only have victim cache performance for our smaller test suite, and work on obtaining victim cache 52 performance for multi-megabyte second-level caches 26 is underway.

Another important use for miss caches 42, especially on-chip at the first-level, is in yield enhancement. If parity is kept on all instruction and data cache 18 and 20 bytes, and the data cache 20 is write-through, then cache parity errors can be handled as misses. If the refill path bypasses the cache, then this scheme can also allow chips with hard errors to be used. (In fact with byte parity, up to 1/9 of all bits in the cache could be faulty as long as there were at most one bad bit per byte.) Unfortunately, without miss caches 42 if the inner loop of linpack (i.e., saxpy) happens to land on a line with a defect or if a frequently used structure variable is on a defective line, the performance of the system can be severely degraded (e.g., by greater than a factor of four on some code segments). Moreover the performance degradation would vary from chip to chip seemingly at random depending on defect location. This would limit the potential yield enhancement to the engineering development phase of a project. However, with the addition of miss caches 42, the penalty on a defect-induced parity miss is only one cycle, which would have a much smaller impact on machine performance than an off-chip miss. Thus, as long as the number of defects was small enough to be handled by the miss cache 42, chips with hard defects could be used in production systems. If miss caches 42 are used to improve system performance in the presence of fabrication defects, then instruction miss caches and even miss caches with only one entry would be useful.

Victim caches 52 as described earlier would not be useful for correction of misses due to parity errors. This is because the victim is corrupted by the parity error, and is not worth saving. However victim caches 52 can also be used for error-correction with the following change. When a cache miss is caused by a parity error, the victim cache 52 is loaded with the incoming (miss) data and not the victim. Thus it acts like a victim cache 52 for normal misses and a miss cache 42 for parity misses. With this minor modification the benefits of miss caches 42 for error-recovery and the better performance of victim caching can be combined.

Compulsory misses are misses required in any cache organization because they are the first references to a piece of data. Capacity misses occur when the cache size is not sufficient to hold data between references. One way of reducing the number of capacity and compulsory misses is to use prefetch techniques such as longer cache line sizes or prefetching methods. However, line sizes cannot be made arbitrarily large without increasing the miss rate and greatly increasing the amount of data to be transferred. In this section we investigate techniques to reduce capacity and compulsory misses while mitigating traditional problems with long lines and excessive prefetching.

Longer line sizes suffer from the disadvantage of providing a fixed transfer size for different programs and access patterns. Prefetch techniques are interesting because they can be more adaptive to the actual access patterns of the program. This is especially important for improving the performance on long quasi-sequential access patterns such as instruction streams or unit-stride array accesses.

Figure 12:
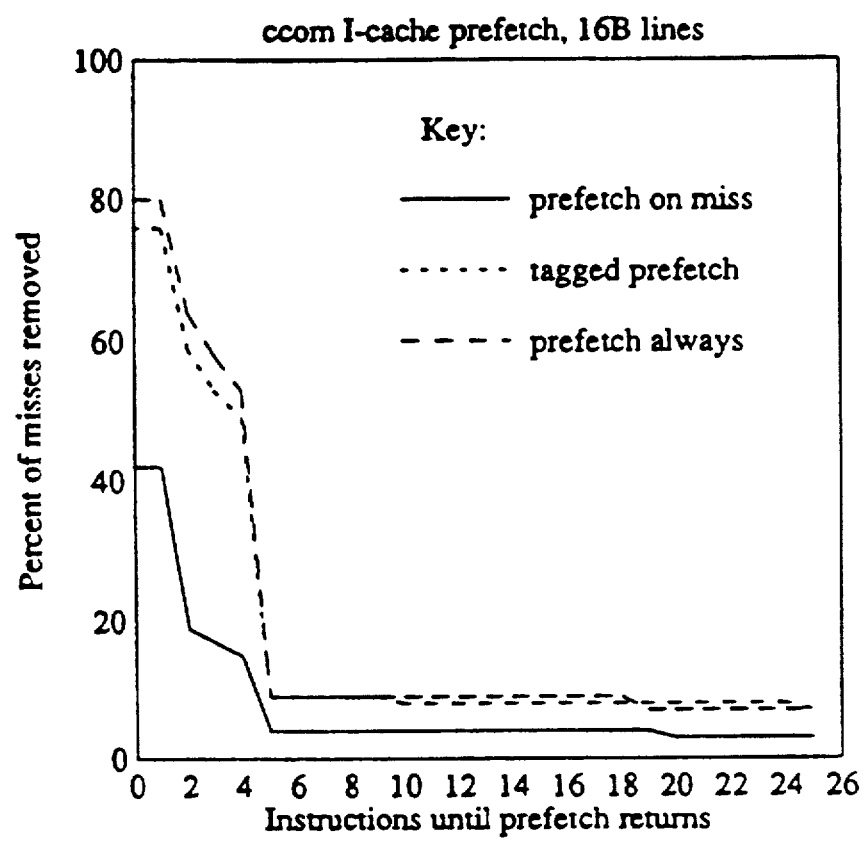
FIG. 12 is a graph showing another aspect of performance of the system of FIG. 1 without incorporation of the invention.

A detailed analysis of three prefetch algorithms has appeared in Smith, Alan J., "Cache Memories," *Computing Surveys*, September 1982, pp. 473–530. Prefetch always prefetches after every reference. Needless to say this is impractical in our base system 10 since many level-one cache accesses can take place in the time required to initiate a single level-two cache reference. This is especially true in machines that fetch multiple instructions per cycle from an instruction cache 18 and can concurrently perform a load or store per cycle to a data cache 20. Prefetch on miss and tagged prefetch are more promising techniques. On a miss, prefetch on miss always fetches the next line as well. It can cut the number of misses for a purely sequential reference stream in half. Tagged prefetch can do even better. In this technique each block has a tag bit associated with it. When a block is prefetched, its tag bit is set to zero. Each time a block is used its tag bit is set to one. When a block undergoes a zero to one transition its successor block is prefetched. This can reduce the number of misses in a purely sequential reference stream to zero, if fetching is fast enough. Unfortunately the large latencies in the base system 10 can make this impossible. Consider FIG. 12, which gives the amount of time (in instruction issues) until a prefetched line is required during the execution of the C compiler benchmark. Not surprisingly, since the line size is four instructions, prefetched lines must be received within four instruction-times to keep up with the machine on uncached straight-line code. Because the base system second-level cache 26 takes many cycles to access, and the machine may actually issue many instructions per cycle, tagged prefetch may only have a one-cycle-out-of-many head start on providing the required instructions.

Figure 13:
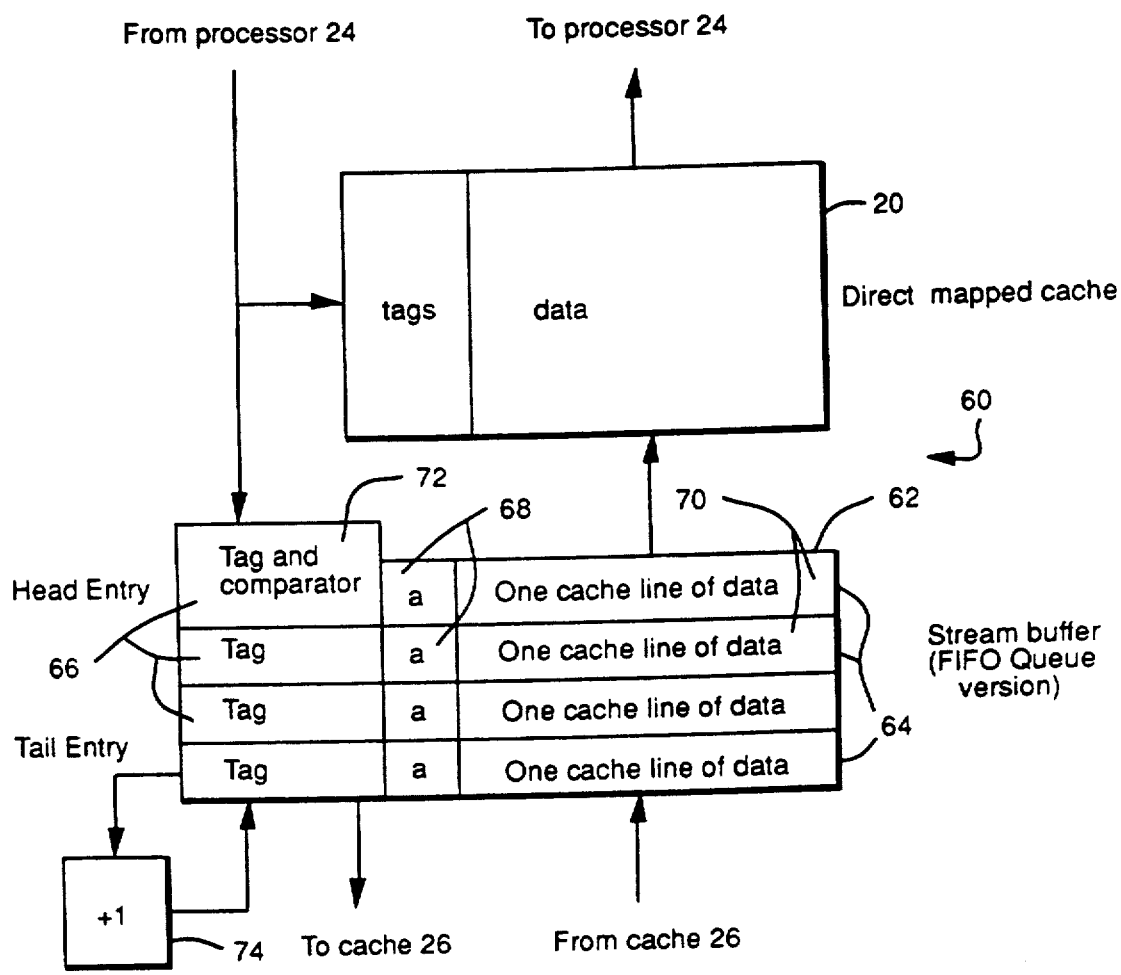
FIG. 13 is a block diagram of a system portion corresponding to that of FIG. 4, but incorporating another embodiment of the invention.

What we really need to do is to start the prefetch before a tag transition can take place. We can do this with a mechanism called a stream buffer 62, as shown in system 60 of FIG. 13. A stream buffer 62 consists of a series of entries 64, each consisting of a tag 66, an available bit 68, and a data line 70.

When a miss occurs, the stream buffer 62 begins prefetching successive lines starting at the miss target. As each prefetch request is sent out, the tag 66 for the address is entered into the stream buffer 62, and the available bit 68 is set to false. When the prefetch data 70 returns it is placed in the entry 64 with its tag 66 and the available bit 68 is set to true. Note that lines after the line requested on the miss are placed in the buffer 62 and not in the cache 20. This avoids polluting the cache 20 with data that may never be needed.

Subsequent accesses to the cache also compare their address against the first item stored in the buffer 62. If a reference misses in the cache 20 but hits in the buffer 62, the cache 20 can be reloaded in a single cycle from the stream buffer 62. This is much faster than the off-chip miss penalty. The stream buffers 62 considered in this section are simple FIFO queues, where only the head of the queue has a tag comparator 72 and elements removed from the buffer 62 must be removed strictly in sequence without skipping any lines. In this simple model non-sequential line misses will cause the stream buffer 62 to be flushed and restarted at the miss address even if the requested line is already present further down in the queue. More complicated stream buffers that can provide already-fetched lines out of sequence are discussed in following sections.

When a line 64 is moved from a stream buffer 62 to the cache 20, the entries in the stream buffer 62 can shift up by one and a new successive address is fetched. The next successive address is generated with the incrementer 74. The pipelined interface to the second level cache 26 allows the buffer 62 to be filled at the maximum bandwidth of the second level cache 26, and many cache lines can be in the process of being fetched simultaneously. For example, assume the latency to refill a 16B line on an instruction cache 18 miss is 12 cycles. Consider a memory interface that is pipelined and can accept a new line request every 4 cycles. A four-entry stream buffer 62 can provide 4B instructions at a rate of one per cycle by having three requests outstanding at all times. Thus, during sequential instruction execution, long latency cache misses will not occur. This is in contrast to the performance of tagged prefetch on purely sequential reference streams where only one line is being prefetched at a time. Here sequential instructions will only be supplied at a bandwidth equal to one instruction every three cycles (e.g., 12 cycle latency/4 instructions per line).

Figure 14:
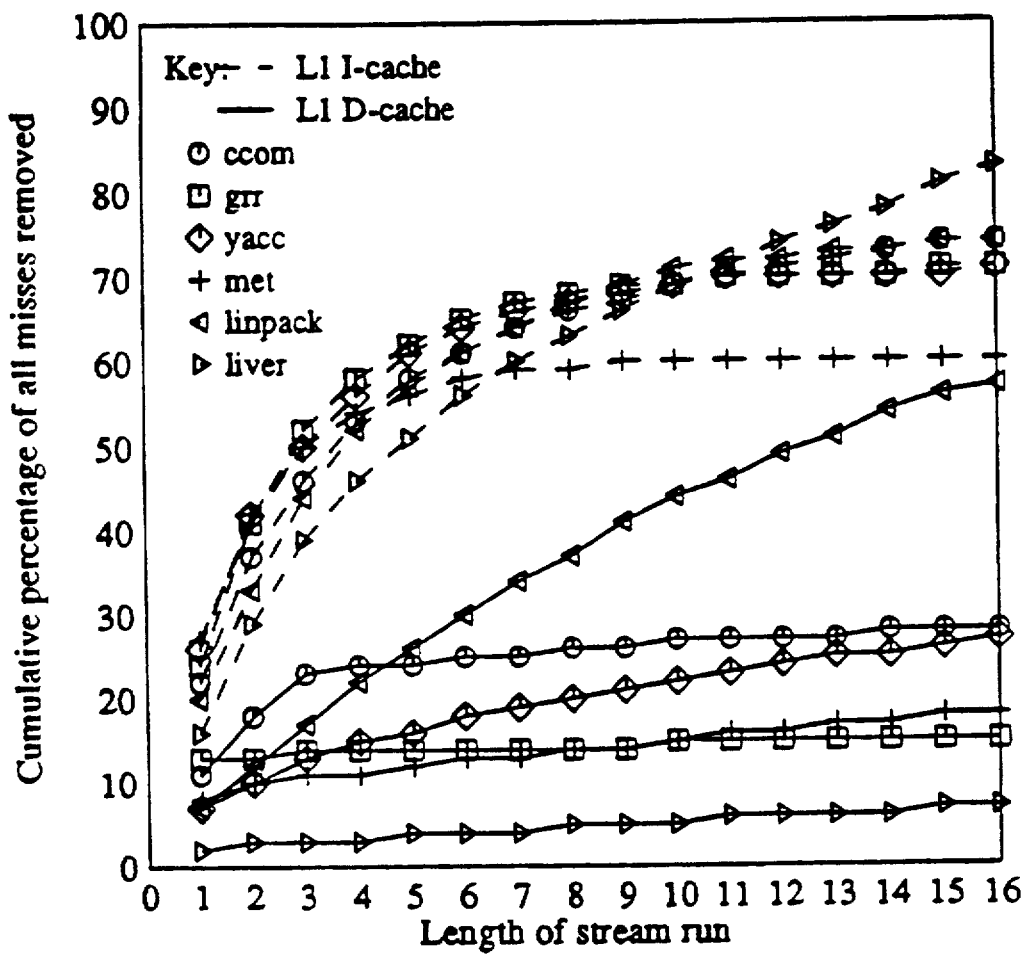
FIGS. 14-15 are graphs showing aspects of performance of a system including the portion of FIG. 13.

FIG. 14 shows the performance of a four-entry instruction stream buffer 62 backing a 4 KB instruction cache 18 and a data stream buffer 62 backing a 4 KB data cache 20, each with 16 byte lines. The graph gives the cumulative number of misses removed based on the number of lines that the buffer is allowed to prefetch starting with the original miss. Most instruction references break the purely sequential access pattern by the time the 6th successive line is fetched, while many data reference patterns end even sooner. The exceptions to this appear to be instruction references for "liver" and data references for "linpack". "liver" is probably an anomaly since the 14 loops of the program are executed sequentially, and the first 14 loops do not generally call other procedures or do excessive branching, which would cause the sequential miss pattern to break. The data reference pattern of "linpack" can be understood as follows. Remember that the stream buffer 62 is only responsible for providing lines that the cache 18 or 20 misses on. The inner loop of "linpack" (i.e. saxpy) performs an inner product between one row and the other rows of a matrix. The first use of the one row loads it into the cache. After that subsequent misses in the cache (except for mapping conflicts with the first row) consist of subsequent lines of the matrix. Since the matrix is too large to fit in the on-chip cache, the whole matrix is passed through the cache on each iteration. The stream buffer 62 can do this at the maximum bandwidth provided by the second-level cache 26. Of course one prerequisite for this is that the reference stream is unit-stride or at most skips to every other or every third word. If an array is accessed in the non-unit-stride direction (and the other dimensions have non-trivial extents) then a stream buffer 62 as presented here will be of little benefit.

Figure 15:
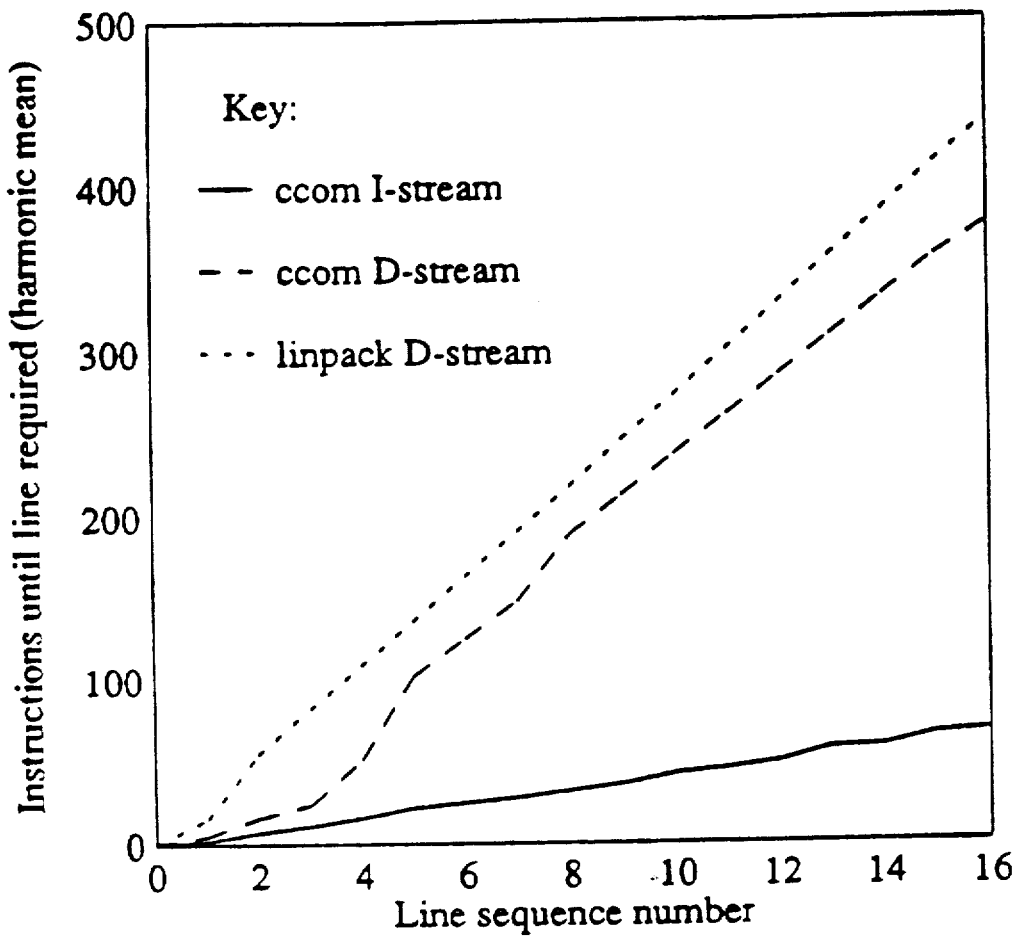

FIG. 15 gives the bandwidth requirements in three typical stream buffer applications. I-stream references for "ccom" are quite regular (when measured in instructions). On average a new 16B line must be fetched every 4.2 instructions. The spacing between references to the stream buffer 62 increases when the program enters short loops and decreases when the program takes small forward jumps, such as when skipping an else clause. Nevertheless the fetch frequency is quite regular. This data is for a machine with short functional unit latencies, such as the Digital Equipment Corporation MultiTitan CPU or the MIPS R2000, so the cycles per instruction (CPI) is quite close to 1 without cache misses.

Data stream buffer reference timings for "linpack" and "ccom" are also given in FIG. 15. The reference rate for new 16B lines for linpack averages one every 27 instructions. Since this version of "linpack" is double-precision, this works out to a new iteration of the inner loop every 13.5 instructions. This is larger than one would hope. This version of "linpack" is rather loose in that it does an integer multiply for addressing calculations for each array element, and the loop is not unrolled. If the loop was unrolled and extensive optimizations were performed the rate of references would increase, but the rate should still be less than that of the instruction stream due to the store traffic on the data side which is not present on the instruction side. "ccom" has interesting trimodal performance. If the next successive line is used next after a miss it is required on average only 5 cycles after the miss. For the next two lines after a miss, successive data lines (16B) are required every 10 instructions on average. The first three lines provide most (82%) of the benefit of the stream buffer 62. After that successive lines are required at a rate closer to that of "linpack", about every 24 instructions on average.

In general, if the backing store can produce data at an average bandwidth of a new word (4B) every cycle, the stream buffer 62 will be able to keep up with successive references. This should suffice for instruction streams, as well as block copies that are heavily unrolled and use double-precision loads and stores. If this bandwidth is not available, the benefit of instruction stream buffers will be reduced and block copies and other similar operations will be negatively impacted as well. However, bandwidths equaling a new word every 1.5 to 2 cycles will still suffice for the many of the data references. Note that these values are for bandwidths, which are much easier to achieve than total latencies such as required by the prefetch schemes in FIG. 12.

Figure 16:
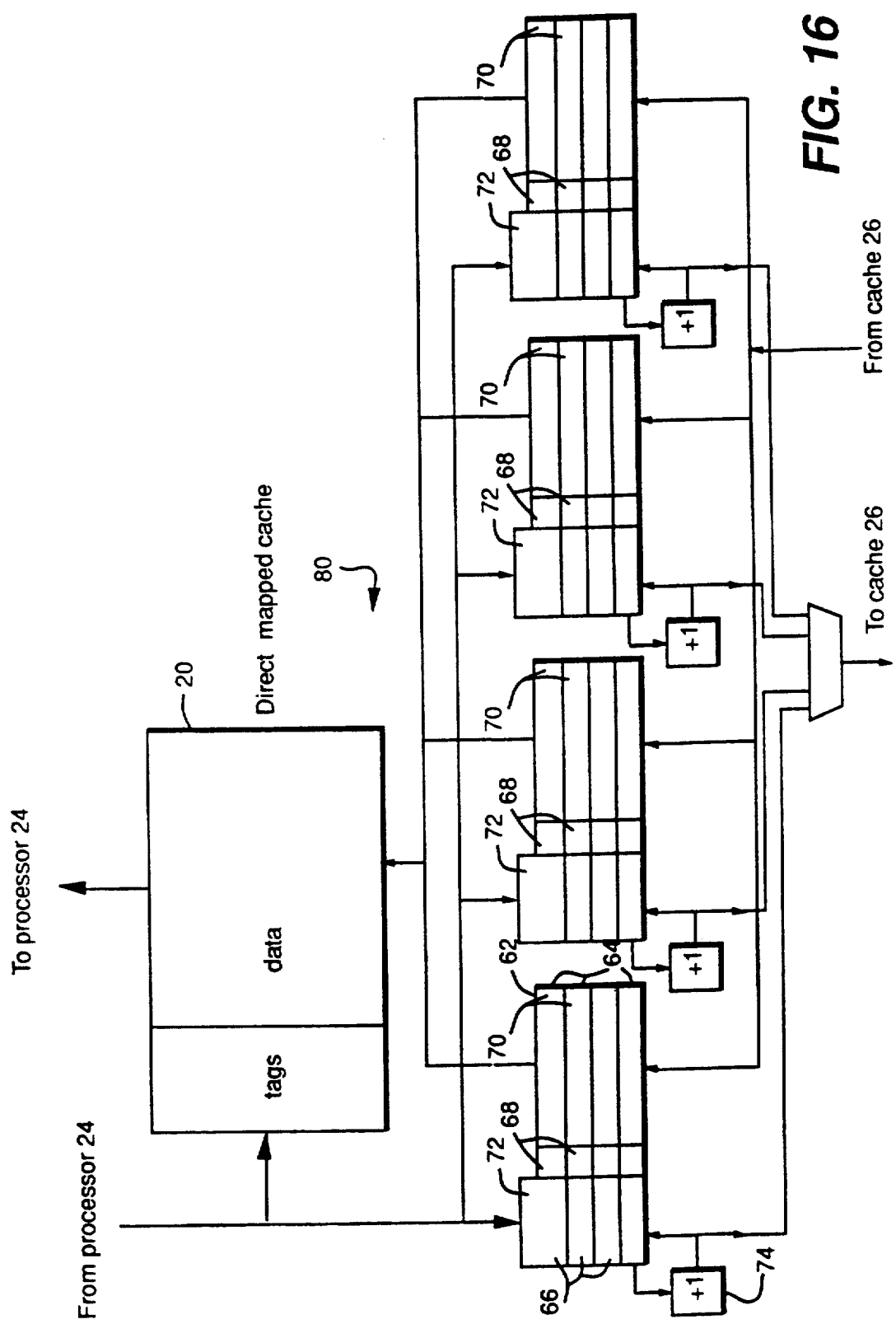
FIG. 16 is a block diagram of a system portion corresponding to that of FIG. 13, but incorporating another embodiment of the invention.

Overall, the stream buffer 62 presented in the previous section could remove 72% of the instruction cache 18 misses, but it could only remove 25% of the data cache 20 misses. One reason for this is that data references tend to consist of interleaved streams of data from different sources. In order to try to improve the performance of stream buffers 62 for data references, a multi-way stream buffer 62 system 80 was simulated (FIG. 16). It consists of four stream buffers 62 in parallel. When a miss occurs in the data cache 20 that does not hit in any stream buffer 62, the stream buffer 62 hit least recently is cleared (i.e. LRU replacement) and it is started fetching at the miss address.

Figure 17:
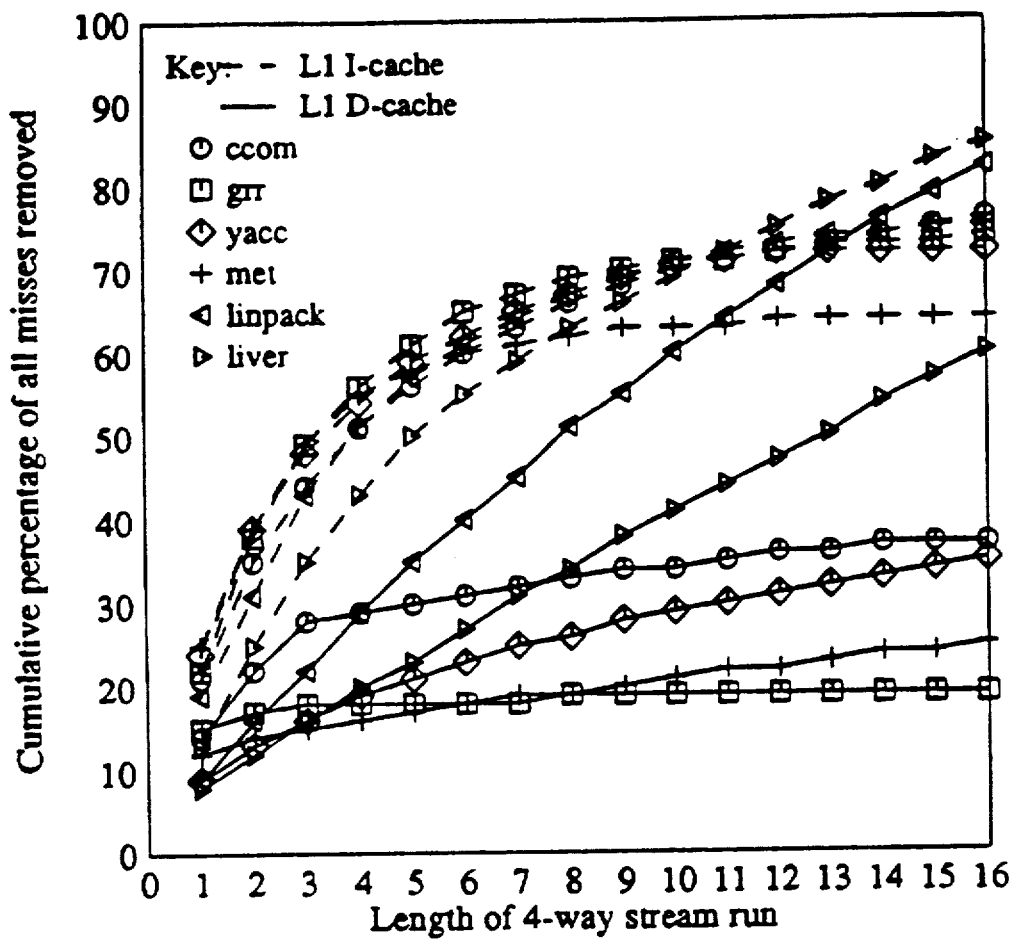
FIGS. 17-18 are graphs showing aspects of performance of a system including the portion of FIG. 13.

FIG. 17 shows the performance of the multi-way stream buffer system 80 on our benchmark set. As expected, the performance on the instruction stream remains virtually unchanged. This means that the simpler single stream buffer system 60 will suffice for instruction streams. The multi-way stream buffer system 80 does significantly improve the performance on the data side, however. Overall, the multiway stream buffer system 80 can remove 43% of the misses for the six programs, almost twice the performance of the single stream buffer system 60. Although the matrix operations of "liver" experience the greatest improvement (it changes from 7% to 60% reduction), all of the programs benefit to some extent. Note also that "liver" makes unit stride accesses to its data structures.

In the previous section only one address comparator was provided for the stream buffer 62. This means that even if the requested line was in the stream buffer 62, but not in the first location with the comparator 72, the stream buffer 62 will miss on the reference and its contents will be flushed. One obvious improvement to this scheme is to place a comparator at each location in the stream buffer 62. Then if a cache line is skipped in a quasi-sequential reference pattern, the stream buffer 62 will still be able to supply the cache line if it has already been fetched.

Figure 18:
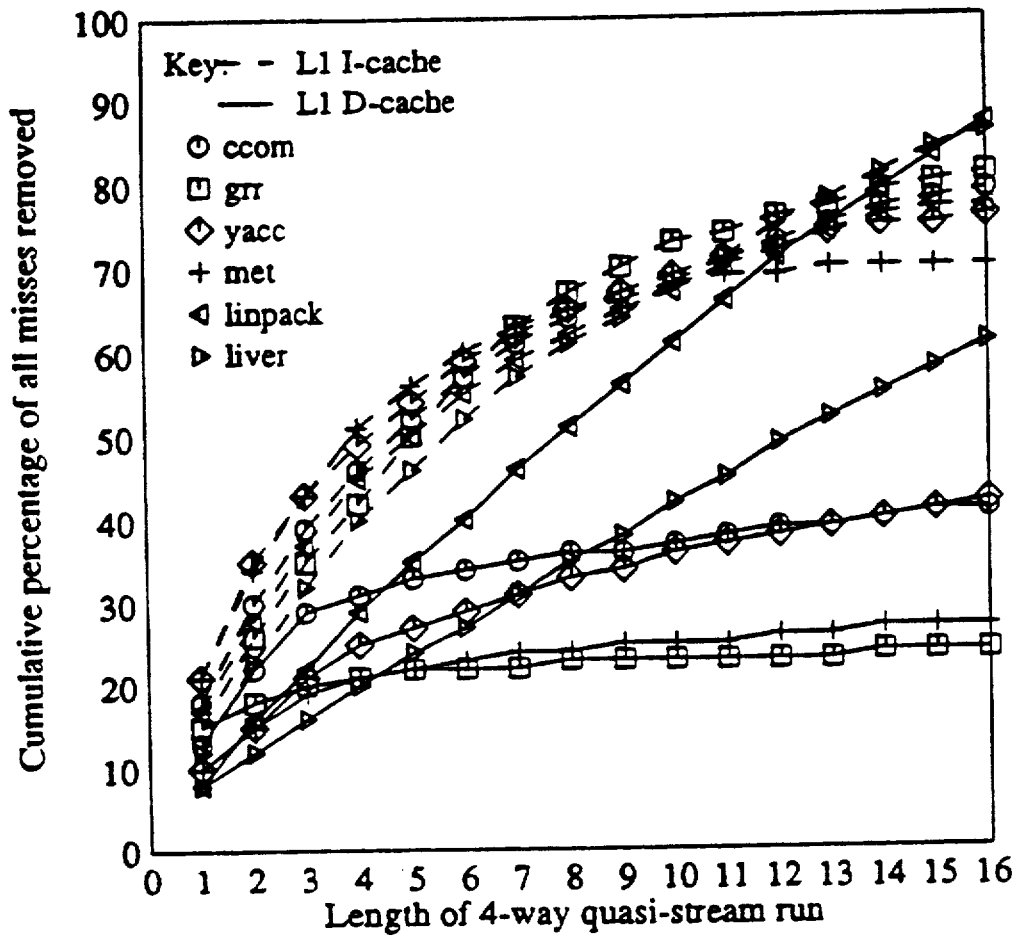

FIG. 18 shows the performance of a stream buffer with three comparators. The quasi-stream buffer is able to remove 76% of the instruction-cache misses, an improvement of 4% over a purely sequential stream buffer, giving a 14% reduction in the number of misses remaining. This is probably due to the quasi-stream buffer's ability to continue useful fetching when code is skipped, such as when "then" or "else" clauses are skipped in "if" statements. The version simulated had three comparators, so it could skip at most 2 cache lines plus up to ¾ of a cache line on either side depending on alignment, for a total of 16 to 22 instructions maximum. This compares with only 0 to 6 instructions that may be skipped in a sequential stream buffer (depending on branch alignment) without causing the stream buffer to be flushed.

The extra comparators of a quasi-stream buffer also improve the performance of a four-way data stream buffer. Overall, the four-way quasi-stream buffer can remove 47% of all misses, which is 4% more than the purely sequential four-way stream buffer.

Since the amount of hardware required for a few extra comparators on a single stream buffer is small, quasi-stream buffers seem like a useful generalization of sequential stream buffers for instruction streams. This is because only two additional comparators would be required to convert a sequential stream buffer into a quasi-stream buffer. However it may not be worthwhile for multi-way data quasi-stream buffers, since the number of extra comparators required would be many times as large. An interesting area for software research is the ability of compilers to reorganize code and data layouts to maximize the use of stream buffers. If techniques to optimize sequentiality of references are successful, the need for extra comparators on stream buffers will be lessened.

In order to put the performance of stream buffers 62 in perspective, in this section we compare the performance of stream buffers to some prefetch techniques previously studied in the literature. The performance of prefetch on miss, tagged prefetch, and always prefetch on our six benchmarks is presented in Table 3. This data shows the reduction in misses assuming the use of these prefetch techniques with a second-level cache latency of one instruction-issue. Note that this is quite unrealistic since one-instruction issue latency may be less than a machine cycle, and second-level caches typically have a latency of many CPU cycles. Nevertheless, these FIGURES give an upper bound of the performance of these prefetch techniques. The performance of the prefetch algorithms in this study is consistent with data earlier presented in the literature. In the Smith paper cited above, reductions in miss rate for a PDP-11 trace TRACE on a 8 KB mixed cache (only mixed caches were studied) with 16B lines and 8-way set associativity was found to be 27.8% for prefetch on miss, 50.2% for tagged prefetch, and 51.8% for prefetch always.

Table 4 compares the prefetch performance from Table 4 with the stream buffer performance presented earlier. On the instruction side, a simple single stream buffer 62 outperforms prefetch on miss by a wide margin. This is not surprising since for a purely sequential reference stream prefetch on miss will only reduce the number of misses by a factor of two. Both the simple single stream buffer system 60 and the quasi-stream buffer system 80 perform almost as well as tagged prefetch. As far as traffic is concerned, the stream buffer 62 will fetch more after a miss than tagged prefetch, but it will not start fetching on a tag transition, so a comparison of traffic ratios would be interesting future research. The performance of the stream buffers 62 on the instruction stream is slightly less than prefetch always. This is not surprising, since the performance of always prefetch approximates the percentage of instructions that are not taken branches, and is an upper bound on the reduction of instruction cache misses by sequential prefetching. However, the traffic ratio of the stream buffer 62 approaches should be much closer to that of prefetch on miss or tagged prefetch than to prefetch always.

TABLE 3

| fetch | ccom | yacc | met | grr | liver | linpack | avg |
|---|---|---|---|---|---|---|---|
| 4KB instr. cache, direct-mapped, 16B lines, 1-instr prefetch latency: | | | | | | | |
| on miss | 44.1 | 42.4 | 45.2 | 55.8 | 47.3 | 42.8 | 46.3 |
| tagged | 78.6 | 74.3 | 65.7 | 76.1 | 89.0 | 77.2 | 76.8 |
| always | 82.0 | 80.3 | 62.5 | 81.8 | 89.5 | 84.4 | 80.1 |
| 4KB data chache, direct-mapped, 16B lines, 1-instr prefetch latency: | | | | | | | |
| on miss | 38.2 | 10.7 | 14.1 | 14.5 | 49.8 | 75.7 | 33.8 |
| tagged | 39.7 | 18.0 | 21.0 | 14.8 | 63.1 | 83.1 | 40.0 |
| always | 39.3 | 37.2 | 18.6 | 11.7 | 63.1 | 83.8 | 42.3 |

TABLE 4

| technique | misses eliminated |
|---|---|
| for 4 KB direct-mapped instruction cache w/16B lines: | |
| Prefetch on miss (1-instr latency) | 46.3 |
| single stream buffer | 72.0 |
| quasi-stream buffer (3 comparator) | 76.0 |
| tagged prefetch (1-instr latency) | 76.8 |
| always prefetch (1-instr latency) | 80.1 |
| for 4KB direct-mapped data cache w/16B lines: | |
| single stream buffer | 25.0 |
| prefetch on miss (1-instr latency) | 33.8 |
| tagged prefetch (1-instr latency) | 40.0 |
| always prefetch (1-instr latency) | 42.3 |
| 4-way stream buffer | 43.0 |
| 4-way quasi-stream buffer | 47.0 |

Table 4 also compares the performance of stream buffers 62 to prefetch techniques for data references. Here all types of 4-way stream buffer systems 80 outperform the prefetch strategies. This is primarily because the prefetch strategies always put the prefetched item in the cache, even if it is not needed. The stream buffer 62 approaches only move an item into to the cache 20 if it is requested, resulting in less pollution than always placing the prefetched data in the cache 20. This is especially important for data references since the spatial locality of data references is less than that of instruction references, and prefetched data is more likely to be pollution than prefetched instructions.

Independent of the relative performance of stream buffers 62 and ideal prefetch techniques, the stream buffer approaches are much more feasible to implement. This is because they can take advantage of pipelined memory systems (unlike prefetch on miss or tagged prefetch for sequential reference patterns). They also have lower latency requirements on prefetched data than the prefetching techniques, since they can start fetching a block before the previous block is used. Finally, at least for instruction stream buffers 62, the extra hardware required by a stream buffer 62 is often comparable to the additional tag storage required by tagged prefetch.

Small miss caches 42 (e.g. 2-8 entries) have been shown to be effective in reducing data cache conflict misses for direct-mapped caches 20 in range of 1K to 8K bytes. They effectively remove tight conflicts where misses alternate between two to four lines that map to the same lines in the cache.

Victim caches 52 are an improvement to miss caching that saves the victim of the cache miss in a small associative cache 52 instead of the target. Victim caches 52 are even more effective at removing conflict misses than miss caches 42. Victim caches 52 are increasingly beneficial as line sizes increase and the percentage of conflict misses increases. In general it appears that as the percentage of conflict misses increases, the percent of these misses removable by a victim cache 52 also increases, resulting in an even steeper slope for the performance improvement possible by using victim caches 52.

Stream buffers 62 prefetch cache lines after a missed cache line. They store the line until it is requested by a cache miss (if ever) to avoid unnecessary pollution of the cache. They are particularly useful at reducing the number of capacity and compulsory misses. They can take full advantage of the memory bandwidth available in pipelined memory systems for sequential references, unlike previously discussed prefetch techniques such as tagged prefetch or prefetch on miss. Stream buffers 62 can also tolerate longer memory system latencies since they prefetch data much in advance of other prefetch techniques (even prefetch always). Stream buffers 62 can also compensate for instruction conflict misses, since these tend to be relatively sequential in nature as well.

Multi-way stream buffer systems 80 are a set of stream buffers 62 that can prefetch down several streams concurrently. In this study the starting prefetch address is replaced over all stream buffers 62 in LRU order. Multi-way stream buffers 62 are useful for data references that contain interleaved accesses to several different large data structures, such as in array operations. However, since the prefetching is of sequential lines, only unit stride (2 or 3) access patterns benefit.

The performance improvements due to victim caches 52 and due to stream buffers 62 are relatively orthogonal for data references. Victim caches 52 work well where references alternate between two locations that map to the same line in the cache. They do not prefetch data but only do a better job of keeping data fetched available for use. Stream buffers 62, however, achieve performance improvements by prefetching data. They do not remove conflict misses unless the conflicts are widely spaced in time, and the cache miss reference stream consists of many sequential accesses. These are precisely the conflict misses not handled well by a victim cache 52 due to its relatively small capacity. Over the set of six benchmarks, on average only 2.5% of 4 KB direct-mapped data cache misses that hit in a four-entry victim cache also hit in a four-way stream buffer for ccom, met, yacc, grr, and livermore. In contrast linpack, due to its sequential data access patterns, has 50% of the hits in the victim cache also hit in the four-way stream buffer. However, only 4% of linpack's cache misses hit in the victim cache. It benefits least from victim caching among the six benchmarks, so this is still not a significant amount of overlap between stream buffers and victim caching.

Figure 19B:
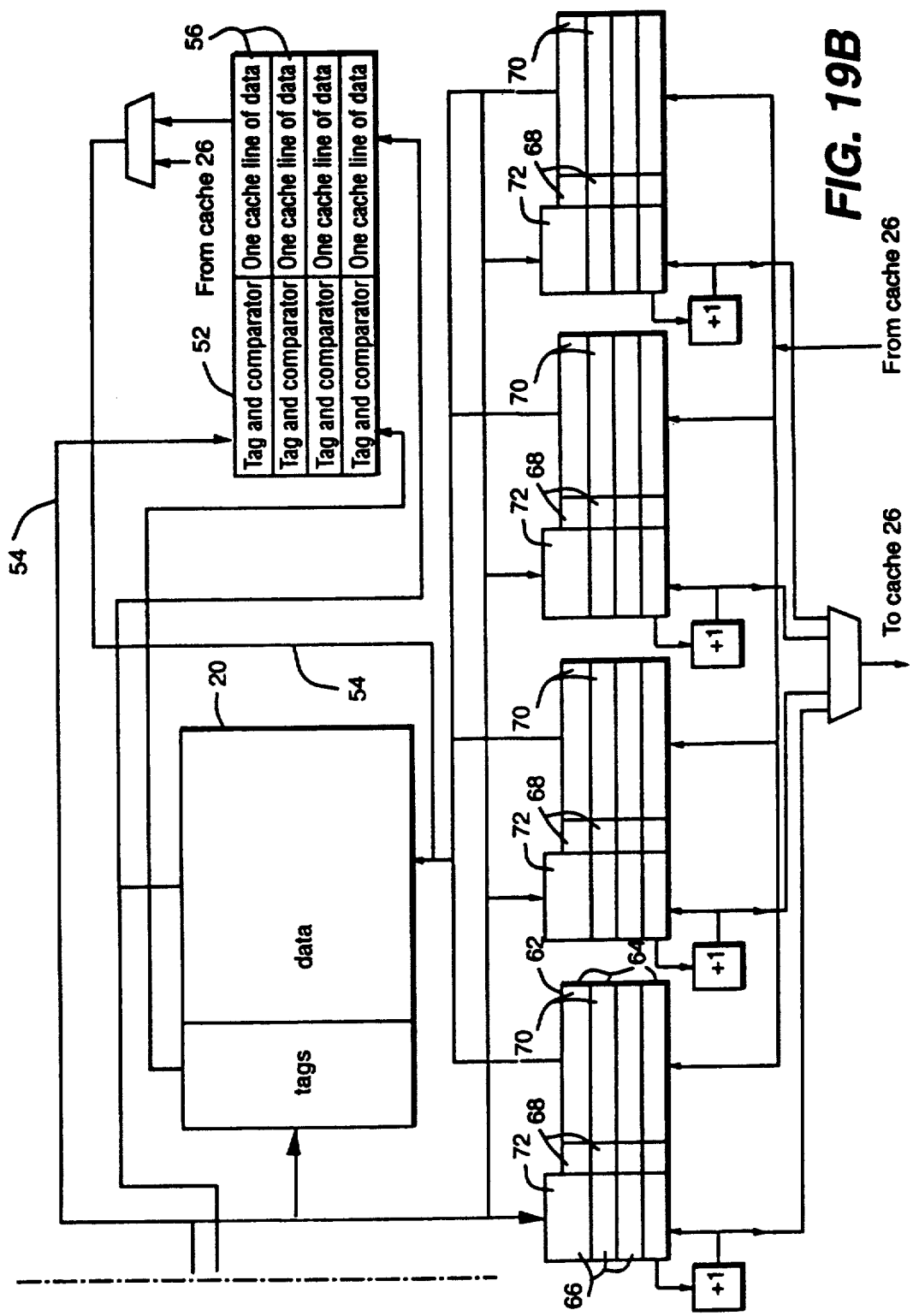
Figure 20:
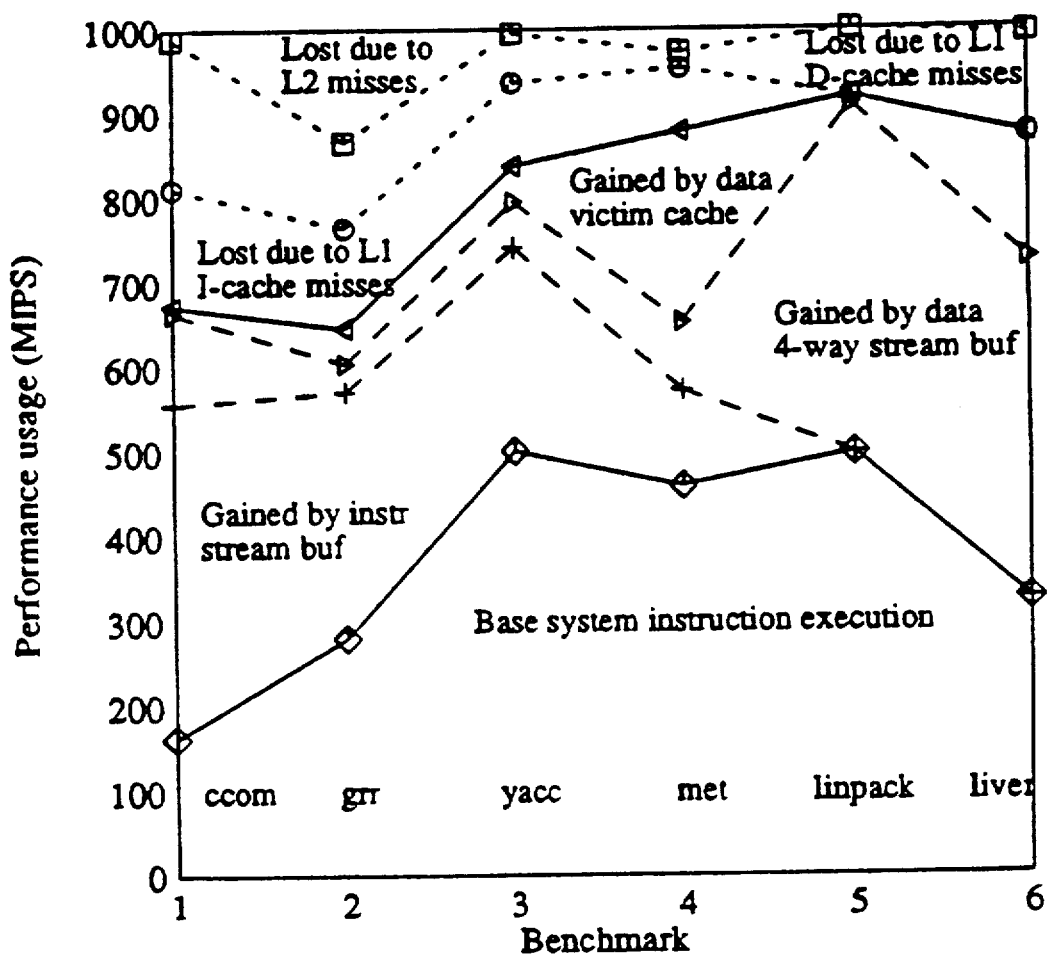
FIG. 20 is a graph showing aspects of performance of the system of FIGS. 19A and 19B.

FIG. 20 shows the performance of the base system 10 with the addition of a four entry data victim cache 52, an instruction stream buffer 62, and a four-way data stream buffer 62 subsystem, as shown in system 100 of FIGS. 19A and 19B. (The base system has on-chip 4 KB instruction and 4 KB data caches with 24 cycle miss penalties and 16 byte lines to a three-stage second-level 1 MB cache with 128 byte lines and 320 cycle miss penalty.) The lower solid line in FIG. 19 gives the performance of the original base system without the victim caches or buffers while the upper solid line gives the performance with buffers and victim caches. The combination of these techniques reduces the first-level miss rate to less than half of that of the baseline system 10 without these features, resulting in a 143% percent improvement in system performance on average over the six benchmarks. These results show that the addition of a small amount of hardware can dramatically reduce cache miss rates and improve system performance.

It should be apparent to those skilled in the art that various changes in form and details of the invention as shown and described may be made. It is intended that such changes be included within the spirit and scope of the claims appended hereto.

What is claimed is:

1. A memory system comprising:
   a first memory for storing information to be supplied to a processor, said first memory including a first direct-mapped cache memory and an associative cache memory coupled to said first direct-mapped cache memory, said associative cache memory having a substantially smaller memory capacity than said first direct-mapped cache memory;
   a second memory for storing information to be supplied to said processor through said first memory; and
   means, coupled to said first memory and said second memory, for addressing information and for supplying information from said second memory to said first direct-mapped cache memory and to said associative cache memory when a miss occurs in said first memory for addressed information, said means for addressing information and for supplying information being connected and configured to displace least recently used information in said associative cache memory with said information supplied to said first direct-mapped cache memory and to said associative cache memory and to supply information from said associative cache memory to said first direct-mapped cache memory when an address misses in said first direct-mapped cache memory and hits in said associative cache memory.

2. The memory system of claim 1, further including a main memory for storing information to be supplied to said processor through said second memory;
   wherein said second memory comprises a second direct-mapped cache memory having substantially larger memory capacity than said first direct-mapped cache memory.

3. The memory system of claim 1, wherein said means for addressing information and for supplying information includes means for supplying information addresses simultaneously to said first direct-mapped cache memory and said associative cache memory.

4. The memory system of claim 1 in which said information supplied to said first memory includes instructions;
   said system additionally including a stream buffer connected between said first direct-mapped cache memory and said second memory, and said means for addressing information and for supplying information includes means for supplying a missed instruction in said first direct-mapped cache memory and for supplying information in at least one address successive to an address for the missed instruction to said stream buffer.

5. The memory system of claim 4 in which said system includes an additional plurality of stream buffers connected between said first direct-mapped cache memory and said second memory, and said means for addressing information and for supplying information includes means for supplying missed data in said first direct-mapped cache memory and for supplying data in at least one address successive to an address for the missed data to said additional plurality of stream buffers.

6. A memory system comprising:
- a first memory for storing information to be supplied to a processor, said first memory including a first direct-mapped cache memory and an associative cache memory coupled to said first direct-mapped cache memory, said associative cache memory having a substantially smaller memory capacity than said first direct-mapped cache memory;
- a second memory for storing information to be supplied to said processor through said first memory; and
- means, coupled to said first memory and said second memory, for addressing information and for (A) supplying information from said second memory to said first direct-mapped cache memory when a miss occurs in both said first direct-mapped cache memory and said associative cache memory for addressed information, (B) supplying information from said associative cache memory to said first direct-mapped cache memory when an address misses in said first direct-mapped cache memory and hits in said associative cache memory, (C) supplying to said associative cache memory information displaced from said first direct-mapped cache memory when said displaced information has been displaced from said first direct-mapped cache memory by information from one of said associative cache memory and said second memory, and (D) displacing least recently used information in said associative cache memory with said information supplied to said associative cache memory.

7. The memory system of claim 6, further including a main memory for storing information to be supplied to said processor through said second memory;
wherein said second memory comprises a second direct-mapped cache memory having substantially larger memory capacity than said first direct-mapped cache memory.

8. The memory system of claim 7, wherein said means for addressing information and for supplying information includes means for supplying information addresses simultaneously to said first direct-mapped cache memory and said associative cache memory.

9. The memory system of claim 7 in which said information supplied to said first memory includes instructions;
said system additionally including a stream buffer connected between said first direct-mapped cache memory and said second memory, and said means for addressing information and for supplying information includes means for supplying a missed instruction in said first direct-mapped cache memory and for supplying information in at least one address successive to an address for the missed instruction to said stream buffer.

10. The memory system of claim 9 in which said system includes an additional plurality of stream buffers connected between said first direct-mapped cache memory and said second memory, and said means for addressing information and for supplying information includes means for supplying missed data in said first direct-mapped cache memory and for supplying data in at least one address successive to an address for the missed data to said additional plurality of stream buffers.

11. A memory accessing method comprising:
(A) simultaneously addressing a first direct-mapped cache memory and a fully associative cache memory, said fully associative cache memory having a substantially smaller memory capacity than said first direct-mapped cache memory;
(B) determining when a miss occurs in the first direct-mapped cache memory in response to the addressing and determining when a miss occurs in said fully associative cache memory in response to the addressing;
(C) supplying information from said associative cache memory to said first direct-mapped cache memory when an address misses in said first direct-mapped cache memory and hits in said associative cache memory; and
(D) supplying information from a larger memory than said first direct-mapped memory to said first direct-mapped cache memory when a miss occurs in both said first direct-mapped cache memory and in said fully associative cache memory.

12. The memory accessing method of claim 11,
said step (D) including supplying said information from said larger memory to both said first direct-mapped cache memory and to said fully associative memory when a miss occurs in both the first direct-mapped cache memory and in said fully associative cache memory, and displacing least recently used information in said fully associative cache memory with said information supplied to said associative cache memory.

13. The memory accessing method of claim 11,
said step (C) including supplying to said fully associative cache memory information displaced from said first direct-mapped cache memory when said displaced information has been displaced from said first direct-mapped cache memory by information from one of said fully associative cache memory and said larger memory, and displacing least recently used information in said fully associative cache memory with said information supplied to said fully associative cache memory.

14. The memory accessing method of claim 11, wherein said larger memory comprises a second direct-mapped cache memory having substantially larger memory capacity than said first direct-mapped cache memory; said step (D) including:
addressing said second direct-mapped cache memory when a miss occurs in both said first direct-mapped cache memory and in said fully associative cache memory; and
supplying information from a main memory to said second direct-mapped cache memory when a miss occurs in said second direct-mapped cache memory.

15. The memory accessing method of claim 11, in which said information supplied to said first direct-mapped cache memory includes instructions; said method including:
supplying a missed instruction in the first direct-mapped cache memory to the first direct-mapped cache memory and supplying information in at least one address successive to an address for the missed instruction to a stream buffer; and supplying said information in the stream buffer to said first direct-mapped cache memory if said first direct-mapped cache memory is addressed with said at least one successive address and a miss occurs in said first direct-mapped cache memory.

16. The memory accessing method of claim 11, in which said information supplied to said first direct-mapped cache memory includes data; said method including:

supplying missed data in the first direct-mapped cache memory to the first direct-mapped cache memory and supplying data in at least one address successive to an address for the missed data to an additional plurality of stream buffers;

supplying said data in said additional plurality of stream buffers to said first direct-mapped cache memory if said first direct-mapped cache memory is addressed with said at least one address successive to the address for the missed data and a miss occurs in said first direct-mapped cache memory.

* * * * *